(12) United States Patent
Lee

(10) Patent No.: US 9,953,312 B2
(45) Date of Patent: Apr. 24, 2018

(54) WEARABLE DEVICE AND METHOD FOR PROCESSING NFC PAYMENT USING THE WEARABLE DEVICE

(71) Applicant: LG ELECTRONICS INC., Seoul (KR)

(72) Inventor: Dongju Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 344 days.

(21) Appl. No.: 14/513,543

(22) Filed: Oct. 14, 2014

(65) Prior Publication Data

US 2016/0034887 A1 Feb. 4, 2016

(30) Foreign Application Priority Data

Jul. 31, 2014 (KR) .................. 10-2014-0098282

(51) Int. Cl.
| | |
|---|---|
| *G06Q 40/00* | (2012.01) |
| *G06Q 20/32* | (2012.01) |
| *G06F 1/16* | (2006.01) |
| *G06F 3/01* | (2006.01) |
| *G06F 3/041* | (2006.01) |
| *G06F 3/0484* | (2013.01) |
| *G06F 3/0488* | (2013.01) |
| *G09G 5/12* | (2006.01) |

(52) U.S. Cl.
CPC ......... *G06Q 20/3278* (2013.01); *G06F 1/163* (2013.01); *G06F 3/017* (2013.01); *G06F 3/0412* (2013.01); *G06F 3/0484* (2013.01); *G06F 3/04883* (2013.01); *G09G 5/12* (2013.01); *G09G 2354/00* (2013.01); *G09G 2370/16* (2013.01)

(58) Field of Classification Search
CPC ....................................................... G06Q 40/00
USPC ...................................................... 705/35, 38
See application file for complete search history.

(56) References Cited

U.S. PATENT DOCUMENTS

| | | | |
|---|---|---|---|
| 7,099,850 B1* | 8/2006 | Mann, II ................. | G06Q 20/16 380/28 |
| 7,689,508 B2* | 3/2010 | Davis ...................... | G06Q 20/10 455/406 |
| 8,452,654 B1* | 5/2013 | Wooters .............. | G06Q 30/0234 705/14.34 |
| 8,500,031 B2* | 8/2013 | Naelon ................... | G06Q 30/06 235/379 |
| 8,583,549 B1* | 11/2013 | Mohsenzadeh ...... | G06Q 20/227 705/38 |
| 8,606,640 B2* | 12/2013 | Brody ................. | G06Q 20/0655 705/26.1 |
| 8,725,842 B1 | 5/2014 | Al-Nasser | |

(Continued)

*Primary Examiner* — Kirsten Apple

(74) *Attorney, Agent, or Firm* — Birch, Stewart, Kolasch & Birch, LLP

(57) ABSTRACT

A wearable device including a touchscreen; a wireless communication unit configured to communicate with an external terminal including an electronic wallet (SE, Secure Element), the external terminal wirelessly linked with the wearable device; and a controller configured to receive a preset user gesture, receive information relating to an account of the electronic wallet (SE) from the external terminal in response to the preset user gesture, display the received information on the touchscreen, and process an NFC (Near Field Communication) payment using the information displayed on the touchscreen.

15 Claims, 27 Drawing Sheets

(56) References Cited

U.S. PATENT DOCUMENTS

| | | | | |
|---|---|---|---|---|
| 8,985,442 B1* | 3/2015 | Zhou | G06Q 30/02 | 235/375 |
| 9,016,565 B2* | 4/2015 | Zhou | G06Q 20/355 | 235/380 |
| 9,047,600 B2* | 6/2015 | Zhou | G06Q 20/322 | |
| 9,177,307 B2* | 11/2015 | Ross | G06Q 20/20 | |
| 2004/0122685 A1* | 6/2004 | Bunce | G06Q 20/04 | 705/67 |
| 2005/0250538 A1* | 11/2005 | Narasimhan | G06Q 20/12 | 455/558 |
| 2006/0208065 A1* | 9/2006 | Mendelovich | G06Q 20/04 | 235/380 |
| 2007/0255564 A1* | 11/2007 | Yee | G10L 17/24 | 704/246 |
| 2010/0191570 A1* | 7/2010 | Michaud | G06Q 30/02 | 705/7.33 |
| 2010/0205091 A1* | 8/2010 | Graziano | G06Q 20/102 | 705/40 |
| 2011/0201306 A1* | 8/2011 | Ali Al-Harbi | G06F 21/42 | 455/411 |
| 2012/0016793 A1* | 1/2012 | Peters | G06Q 20/10 | 705/39 |
| 2012/0030043 A1* | 2/2012 | Ross | G06Q 20/20 | 705/16 |
| 2012/0271712 A1* | 10/2012 | Katzin | G06Q 30/06 | 705/14.51 |
| 2013/0030934 A1* | 1/2013 | Bakshi | G06Q 20/40 | 705/18 |
| 2013/0110264 A1* | 5/2013 | Weast | G06F 19/3481 | 700/91 |
| 2013/0332354 A1 | 12/2013 | Rhee et al. | | |
| 2014/0089119 A1 | 3/2014 | Fahn et al. | | |
| 2014/0089672 A1 | 3/2014 | Luna et al. | | |
| 2014/0108241 A1* | 4/2014 | Tunnell | G06Q 20/363 | 705/41 |
| 2014/0108260 A1 | 4/2014 | Poole et al. | | |
| 2014/0164082 A1* | 6/2014 | Sun | G06Q 30/0214 | 705/14.16 |
| 2014/0244365 A1* | 8/2014 | Price | G07B 15/00 | 705/13 |
| 2015/0206045 A1* | 7/2015 | Gazdzinski | G06Q 10/08 | 235/492 |
| 2015/0220924 A1* | 8/2015 | Bakker | G06Q 20/4014 | 705/14.27 |
| 2015/0242837 A1* | 8/2015 | Yarbrough | G06Q 20/327 | 705/44 |
| 2015/0294303 A1* | 10/2015 | Hanson | G06Q 20/346 | 235/379 |
| 2015/0310412 A1* | 10/2015 | Calderon | G06Q 20/204 | 235/380 |
| 2015/0339696 A1* | 11/2015 | Zhou | G06Q 30/0222 | 705/14.23 |
| 2015/0371215 A1* | 12/2015 | Zhou | G06Q 30/02 | 705/71 |
| 2015/0379619 A1* | 12/2015 | Verde | G06F 3/0488 | 705/27.1 |
| 2016/0014129 A1* | 1/2016 | Park | A61B 5/681 | 726/1 |
| 2016/0034887 A1* | 2/2016 | Lee | G09G 5/12 | 705/39 |
| 2016/0063474 A1* | 3/2016 | Spencer, II | G06Q 20/322 | 705/39 |
| 2016/0189137 A1* | 6/2016 | Zhou | G06Q 20/3274 | 705/14.34 |

* cited by examiner

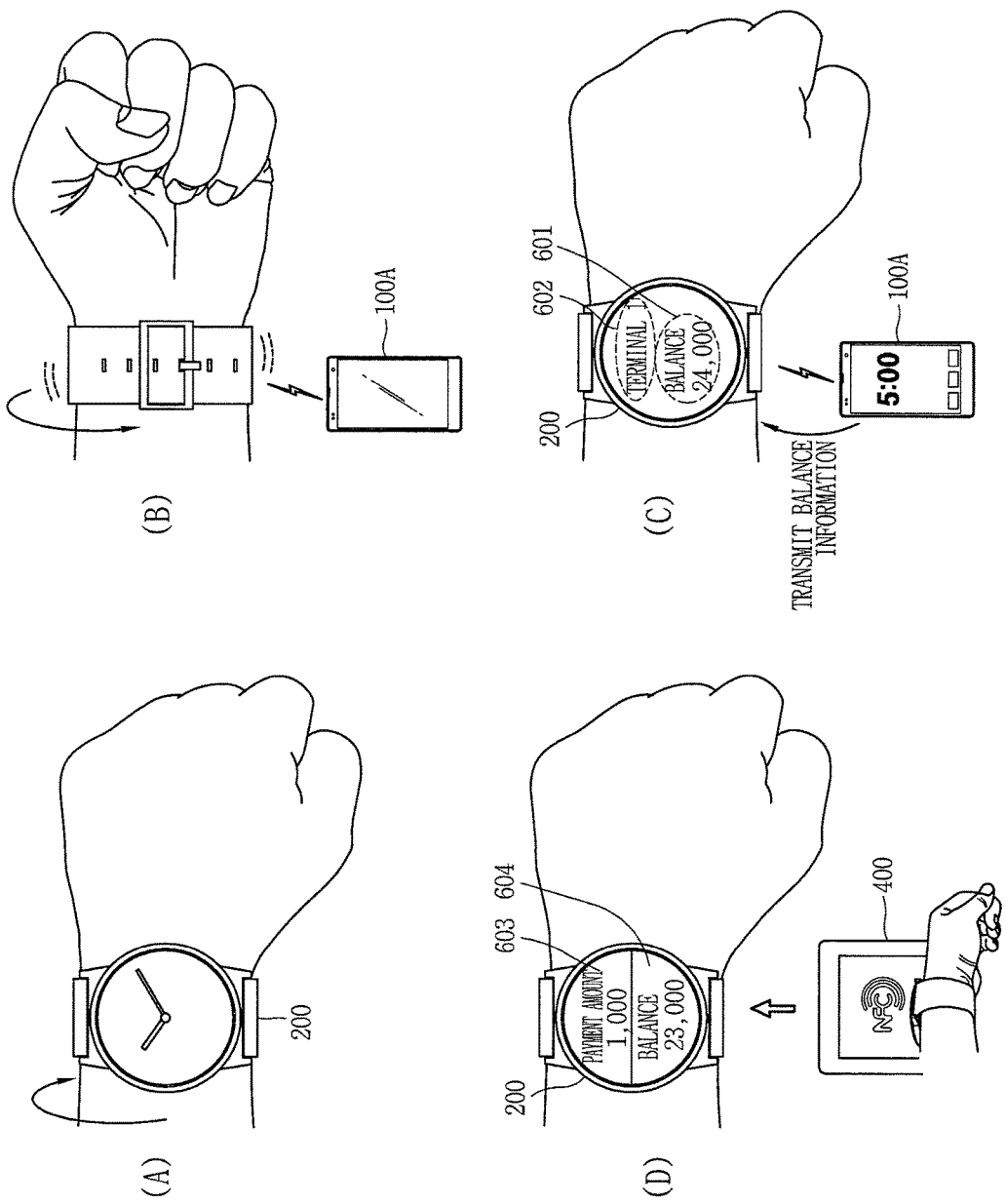

FIG. 7C
(A) 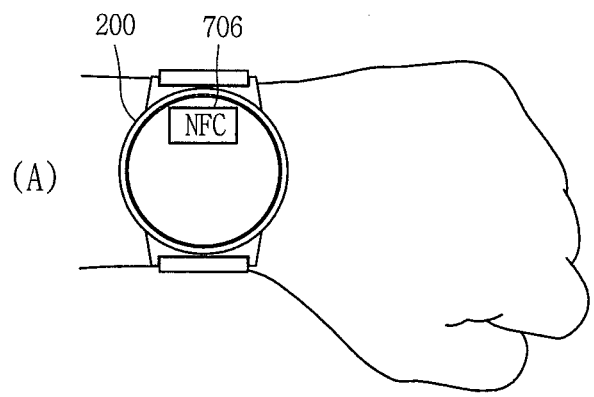
(B) 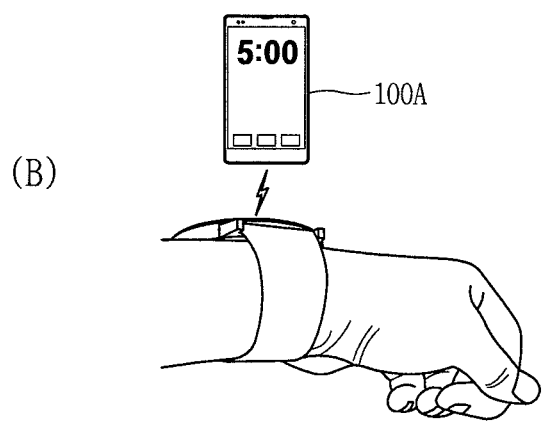
(C) 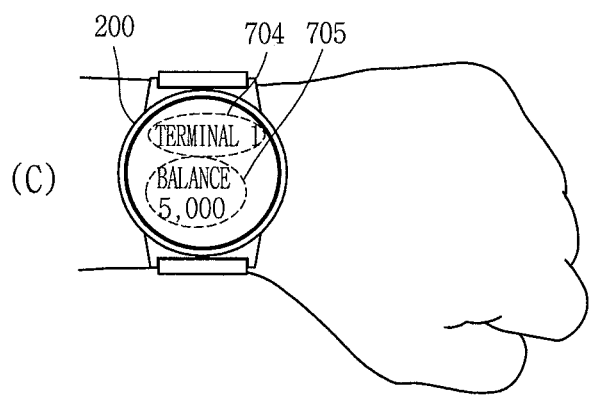

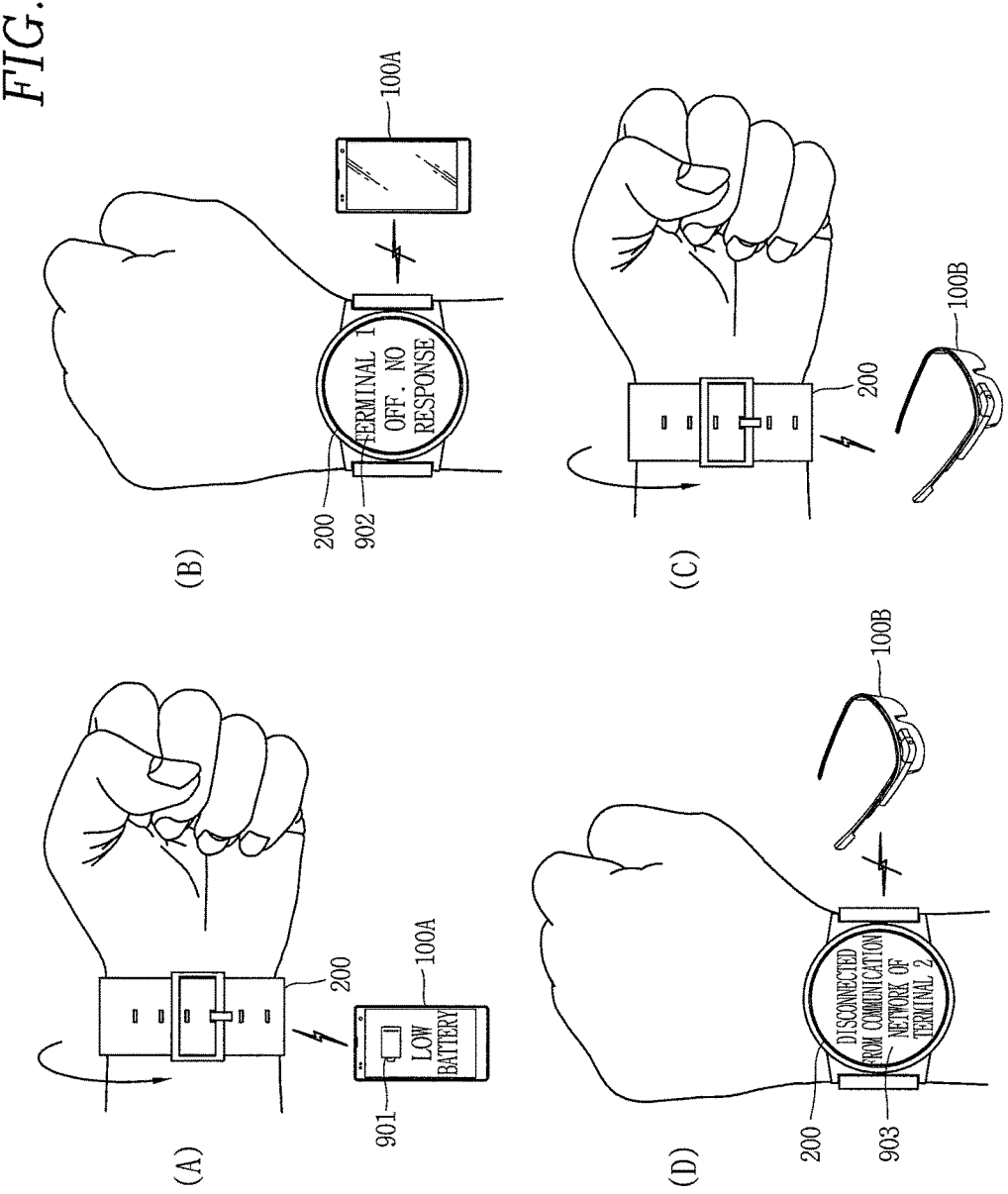

WEARABLE DEVICE AND METHOD FOR PROCESSING NFC PAYMENT USING THE WEARABLE DEVICE

CROSS-REFERENCE TO RELATED APPLICATION

Pursuant to 35 U.S.C. §119(a), this application claims the benefit of earlier filing date and right of priority to Korean Application No. 10-2014-0098282, filed on Jul. 31, 2014, the contents of which is incorporated by reference herein in its entirety.

BACKGROUND OF THE INVENTION

1. Field of the Invention

The present invention relates to a wearable device that can perform a payment function using a near-field wireless communication module and a method for controlling the same.

2. Background of the Invention

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Meanwhile, mobile terminals have advanced from hand-held devices to wearable devices that can be placed on the human body. Such wearable devices include smart watches, smart glasses, and HMDs (Head Mounted Displays). Further, efforts to provide various financial services and payment services by adopting near-field communication technology, such as, NFC (Near Field Communication), using such wearable devices are underway. Here, NFC (Near Field Communication) is a contactless short-haul wireless communication typically employing a frequency band of 13.56 MHz and enables data transmission between NFC chip-equipped terminals within a short range of about 10 cm.

In addition, in order to conduct a variety of financial services and payment services using the NFC technology, the wearable devices need to previously retain information relating to a payment method (e.g., a credit card), and in such case, if the payment method is lost, the information retained in the payment method may be subject to malicious leakage. In particular, the wearable device, which is placed on the user's body, has a relatively small size and thus consumes less power. Accordingly, the function of storing information relating to the payment method through an SIM or UICC is selectively included or excluded.

SUMMARY OF THE INVENTION

Therefore, an aspect of the detailed description is to provide a wearable device that can perform payment using a near-field communication technique without previously storing information on a payment method and a method of controlling the same.

Another aspect of the detailed description is to provide a wearable device that can more efficiently perform payment using near-field technique by sharing or communicating an amount of money charged to a second device and a method of controlling the same.

To achieve these and other advantages and in accordance with the purpose of this specification, as embodied and broadly described herein, there is provided a wearable device, comprising: a touchscreen; a wireless communication unit configured to communicate with a second terminal equipping an electronic wallet (SE, Secure Element), the second terminal linked with the wearable device; and a controller configured to receive information relating to an account of the electronic wallet (SE) from the second terminal when sensing a preset user gesture and to display the received information on a region of the touchscreen, wherein the controller is configured to perform control to process NFC (Near Field Communication) payment using the information displayed on the touchscreen.

In an embodiment, the preset user gesture includes a first user gesture and a second user gesture, and wherein the controller is configured to perform control to send, to the second terminal, a request for transmitting the information relating to the account of the electronic wallet (SE) when sensing the first user gesture, and the controller is configured to perform control to display the information received from the second terminal on the touchscreen according to the request when sensing the second user gesture.

In an embodiment, the controller is configured to an activate an NFC function for the NFC payment and to output a feedback indicating that the NFC function is activated when sensing the preset user gesture.

In an embodiment, the wearable device further comprises a sensing unit configured to sense that the wearable device is rotated in different directions from each other while the wearable device is placed on a user, wherein the controller is configured to execute a control operation corresponding to the first user gesture when sensing that the wearable device is rotated in a first direction, and the controller is configured to execute a control operation corresponding to the second user gesture when sensing that the wearable device is rotated in a second direction while the control operation corresponding to the first user gesture is in execution.

In an embodiment, the controller is configured to output a feedback corresponding to a response of the second terminal according to the request.

In an embodiment, the feedback includes a combination of at least one or more of a vibration, a sound, and a screen change on the touchscreen, and wherein when the linkage with the second terminal fails, the controller is configured to output a feedback corresponding to the failure and to output first screen information indicating a cause of the failure on the touchscreen.

In an embodiment, the controller is configured to display balance information corresponding to the account of the electronic wallet (SE) on a region of the touchscreen when the linkage with the second terminal is maintained while the preset user gesture is sensed.

In an embodiment, the controller is configured to output second screen information indicating a result of processing the NFC payment on the region of the touchscreen when re-sensing the preset user gesture after the NFC payment is complete based on the information displayed on the touchscreen.

In an embodiment, the touchscreen includes a first region and a second region distinguished from the first region, and wherein the controller is configured to, when the NFC payment is complete, display an NFC payment amount on the first region, update the information relating to the account of the electronic wallet (SE) based on the NFC payment amount, and display the updated information on the second region.

In an embodiment, the controller is configured to, when a level of the updated information is not more than a reference level, output guide information to guide charging a balance corresponding to the account of the electronic wallet (SE) on the region of the touchscreen.

In an embodiment, the controller is configured to, a predetermined time after the NFC payment is complete, switch the NFC function for the NFC payment to a deactivated state and to release the linkage with the second terminal or change a communication network maintaining the linkage to another network.

In an embodiment, the wearable device further comprises a power supply unit configured to supply operation power to the wearable device, wherein the controller is configured to, when a level of a battery included in the power supply unit is not more than a reference level, display the information relating to the account of the electronic wallet (SE) only on the region of the touchscreen and to switch a second region other than the region to a deactivated state.

In an embodiment, the controller is configure to recognize linkable second terminals and is configured to, when the preset user gesture is sensed, perform linkage with a second terminal corresponding to the preset user gesture among the recognized second terminals.

In an embodiment, the wearable device further comprises a compartment unit formed to equip an electronic wallet (SE), wherein the controller is configured to, when the preset user gesture is sensed while the wearable device is linked with the second terminal, display on the touchscreen first information relating to an account of a first electronic wallet equipped in the compartment unit and second information relating to an account of a second electronic wallet equipped in the second terminal so the first information may be distinguished from the second information.

In an embodiment, the touchscreen includes a first region and a second region distinguished from the first region, and wherein the controller is configured to perform control to process the NFC payment using the first information, and when the NFC payment is complete, the controller is configured to perform control to display an NFC payment amount on the first region, update the first information based on the NFC payment amount, and display the updated information on the second region.

In an embodiment, the controller is configured to, when the first information is insufficient to process the NFC payment, perform control to process the NFC payment using the first information and the second information, and the controller is configured to, when the NFC payment is complete, perform control to display the NFC payment amount on the first region, update the first and second information based on the NFC payment amount, and display the updated information on the second region.

In an embodiment, the controller is configured to, when a third user gesture is input while the first and second information is displayed on the touchscreen, perform control to transmit at least a portion of a balance of a corresponding account from any one of an account of the first electronic wallet and an account of the second electronic wallet to the other account.

In an embodiment, the third user gesture is preset user gesture, wherein the wearable device further comprises a sensing unit configured to sense an inclination corresponding to the third user gesture, and wherein the controller is configured to determine an account to which at least the portion of the balance is transmitted and a degree of the balance based on at least one of a direction and degree of the inclination corresponding to the third user gesture.

In an embodiment, the third user gesture is a touch input applied to the touchscreen, wherein the touchscreen includes a first region displaying the first information and a second region displaying the second information, and wherein the controller is configured to display an image object dividing the first region and the second region on the touchscreen, determine the account to which the at least portion of the balance is transmitted and the degree of the balance based on the touch input applied to the image object, and display the image object on a point where the touch input is released.

To achieve these and other advantages and in accordance with the purpose of this specification, as embodied and broadly described herein, there is provided a method of controlling a wearable device, the wearable device formed to be placed on a particular portion of a body, the method comprising: receiving an information relating to an account of an electronic wallet (SE, Secure Element) equipped in a second terminal linked with the wearable device from the second terminal when the wearable device senses a preset user gesture; displaying the received information on a region of a touchscreen; and performing control to process NFC (Near Field Communication) payment using the information displayed on the touchscreen.

Further scope of applicability of the present application will become more apparent from the detailed description given hereinafter. However, it should be understood that the detailed description and specific examples, while indicating preferred embodiments of the invention, are given by way of illustration only, because various changes and modifications within the spirit and scope of the invention will become apparent to those skilled in the art from the detailed description.

BRIEF DESCRIPTION OF DRAWINGS

The accompanying drawings, which are included to provide a further understanding of the invention and are incorporated in and constitute a part of this specification, illustrate embodiments and together with the description serve to explain the principles of the invention.

In the drawings:

FIG. 6 is a concept view illustrating the flowchart shown in FIG. 5;

FIG. 7C is a concept view illustrating a method by which a wearable device is linked with a second terminal through NFC according to an embodiment of the present invention;

FIG. 9A is a concept view illustrating a processing method upon linkage failure of the pairing of a wearable device and a second terminal according to an embodiment of the present invention;

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, a wearable device (e.g., smart watch), a glass-type terminal (e.g., smart glass), a head mounted display (HMD), etc. However, the present invention may be also applicable to a fixed terminal such as a digital TV, a desktop computer and a digital signage, except for specific configurations for mobility.

As described herein, the wearable device may be configured to exchange (or associate) data with other mobile terminal. For example, the mobile terminal can sense (or recognize) an adjacent wearable device that can communicate with the mobile terminal. Further, when the sensed wearable device is a device authenticated to communicate with the mobile terminal, at least a portion of data processed in the mobile terminal can be transmitted to the wearable device. Accordingly, the user can use the data processed in the mobile terminal using the wearable device. For example, when a call is received by the mobile terminal, the user can perform the call through the wearable device, or when a message is received by the mobile terminal, the user can check the received message through the wearable device.

Figure 1A:
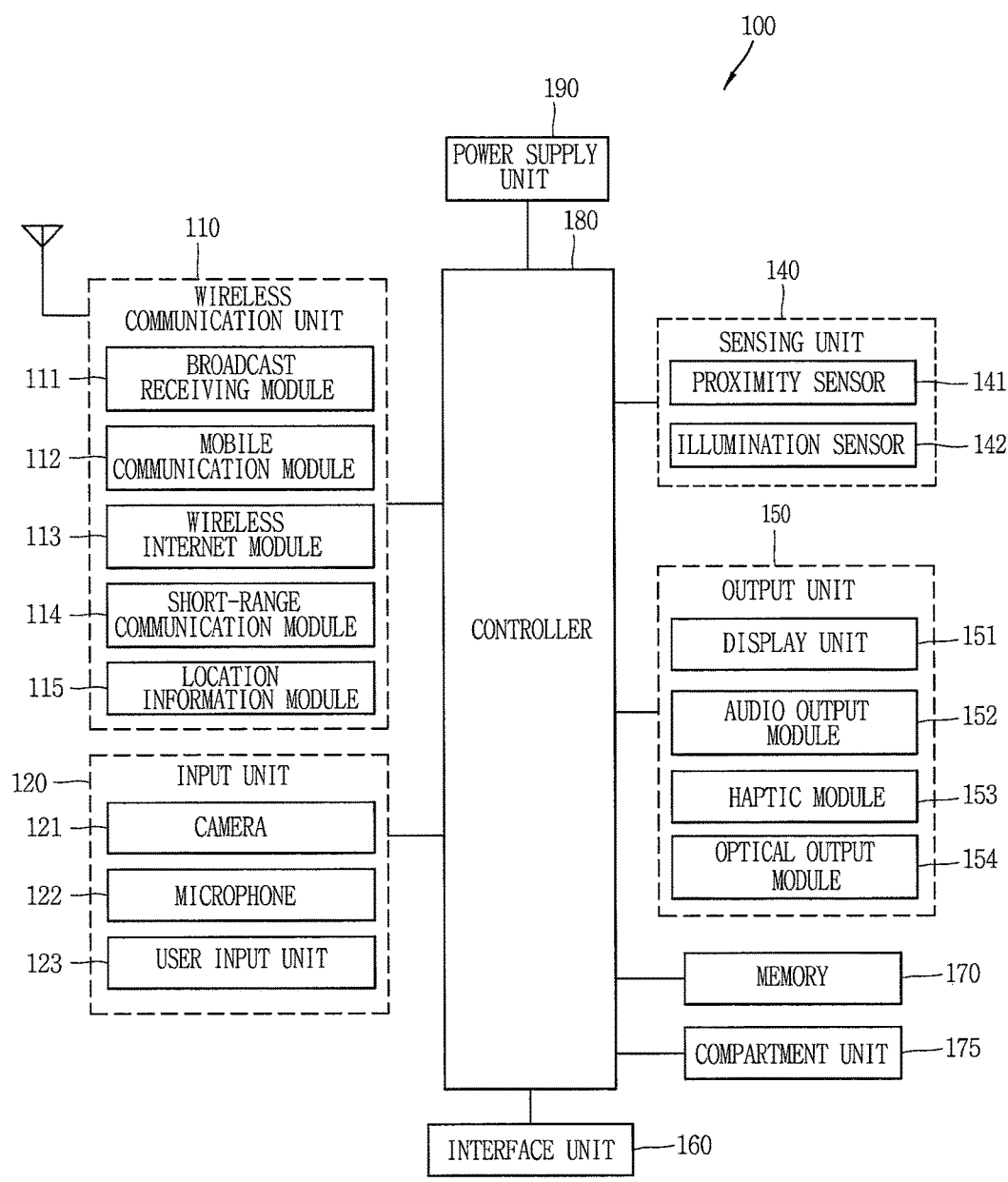
FIG. 1A is a block diagram illustrating a mobile terminal associated with a wearable device according to an embodiment of the present invention.

FIG. 1A is a block diagram illustrating the configuration of a mobile terminal 100 associated with a wearable device according to an embodiment of the present invention.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components of FIG. 1A is not a requirement, and that greater or fewer components may alternatively be implemented.

Referring now to FIG. 1A, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal can be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller can process the received signals, and then transmit corresponding data to the controller 180. Accordingly, the controller 180 can sense which region of the display unit 151 has been touched. Here, the touch controller can be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Because light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information. In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like. The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition. The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Another mobile terminal (which may be configured similarly to the mobile terminal) may be a wearable device, for example, a smart watch, a smart glass or a head mounted display (HMD), which can exchange data with the mobile terminal 100 (or otherwise cooperate with another mobile terminal). FIG. 1A also illustrates a predetermined compartment unit 175 to equip an electronic wallet (SE), which will be discussed in more detail with respect to FIG. 16

Figure 1B:
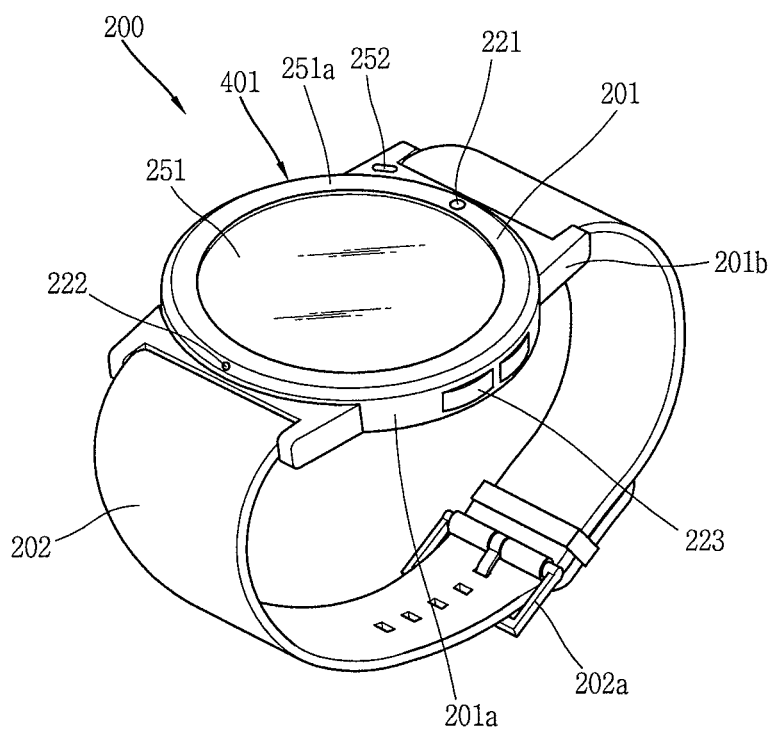
FIG. 1B is a view illustrating a watch-type terminal as an example of a wearable device according to an embodiment of the present invention.

FIG. 1B is a perspective view illustrating one example of a watch-type mobile terminal 200 in accordance with another embodiment. As illustrated in FIG. 1B, the watch-type mobile terminal 200 includes a main body 201 with a display unit 251 and a band 202 connected to the main body 201 to be wearable on a wrist. In general, mobile terminal 200 may be configured to include features that are the same or similar to that of mobile terminal 100 of FIG. 1A.

The main body 201 may include a case having a certain appearance. As illustrated, the case may include a first case 201a and a second case 201b cooperatively defining an inner space for accommodating various electronic components. Other configurations are possible. For instance, a single case may alternatively be implemented, with such a case being configured to define the inner space, thereby implementing a mobile terminal 200 with a uni-body.

The watch-type mobile terminal 200 can perform wireless communication, and an antenna for the wireless communication can be installed in the main body 201. The antenna may extend its function using the case. For example, a case including a conductive material may be electrically connected to the antenna to extend a ground area or a radiation area. The display unit 251 is shown located at the front side of the main body 201 so that displayed information is viewable to a user. In some embodiments, the display unit 251 includes a touch sensor so that the display unit can function as a touch screen. As illustrated, window 251a is positioned on the first case 201a to form a front surface of the terminal body together with the first case 201a.

The illustrated embodiment includes an audio output module 252, a camera 221, a microphone 222, and a user input unit 223 positioned on the main body 201. When the display unit 251 is implemented as a touch screen, additional function keys may be minimized or eliminated. For example, when the touch screen is implemented, the user input unit 223 may be omitted.

Further, the main body 201 or the band 202 may have, in a region, one or more of a motion sensor, a gyroscope sensor, a G-sensor, a magnetic sensor, and an acceleration sensor for sensing the gesture of the user wearing the main body, and the user's gesture may be sensed from a combination of information pieces sensed through at least one or more of the sensors.

The band 202 is commonly worn on the user's wrist and may be made of a flexible material for facilitating wearing of the device. As one example, the band 202 may be made of fur, rubber, silicon, synthetic resin, or the like. The band 202 may also be configured to be detachable from the main body 301. Accordingly, the band 202 may be replaceable with various types of bands according to a user's preference.

In one configuration, the band 202 may be used for extending the performance of the antenna. For example, the band may include therein a ground extending portion electrically connected to the antenna to extend a ground area. The band 202 may include fastener 202a. The fastener 202a may be implemented into a buckle type, a snap-fit hook structure, a Velcro® type, or the like, and include a flexible section or material. The drawing illustrates an example that the fastener 202a is implemented using a buckle.

Figure 2:
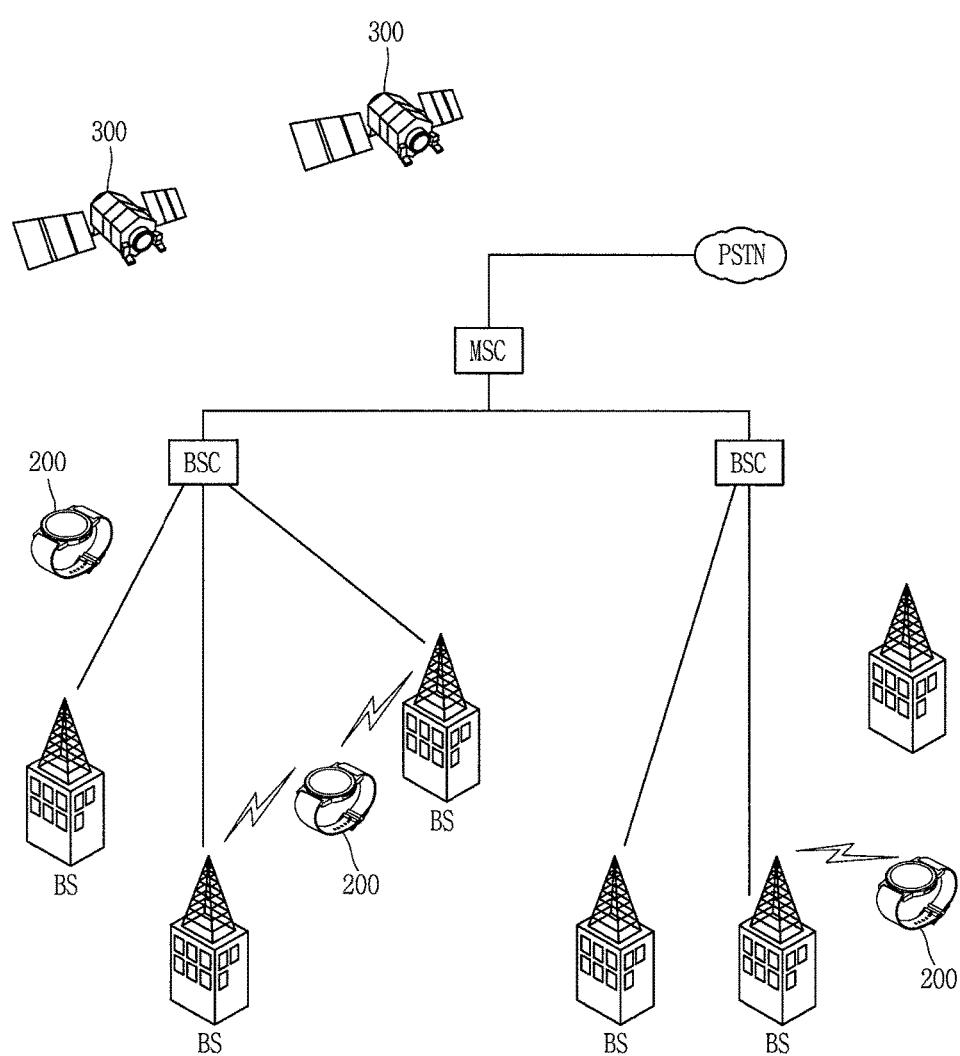
FIG. 2 is a view illustrating a wireless communication system in which a wearable device may operate, according to an embodiment of the present invention.

Next, FIG. 2 is a view illustrating a wireless communication system in which a wearable device may operate, according to an embodiment of the present invention. A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites. A broadcasting transmitter (BT) transmits a broadcast signal to the mobile terminals 100 operating within the system. The broadcast receiving module 111 of FIG. 1A is typically configured inside the wearable device 200 to receive broadcast signals transmitted by the BT.

Global Positioning System (GPS) satellites for locating the position of the wearable device 200, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

As previously described with regard to FIG. 1A, the mobile terminal can be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

When the NFC module operates in a card mode, the mobile terminal can transmit card information on a general IC card to the outside. More specifically, if a mobile terminal having card information on a payment card (e.g., a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal can be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller can execute a browser (e.g., Internet browser). If the data received from the external tag is a text type, the controller can execute a text viewer. If the data received from the external tag is a URI type, the controller can execute a browser or originate a call. If the data received from the external tag is a general control type, the controller can execute a proper operation according to control content.

When the NFC module operates in a P2P (Peer-to-Peer) mode, the mobile terminal can execute P2P communication with another mobile terminal. In this instance, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

The wearable device 200 that may include at least one or more of the above-described configurations, when sensing a preset gesture of the user, can receive information associated with the account corresponding to an electronic wallet (SE, Secure Element) equipped in a second terminal from the second terminal through the wireless communication unit 110 (refer to FIG. 1a) and may display the received information. Here, the second terminal means a device associated with the wearable device 200, which has been previously registered through the second terminal or the wearable device 200.

Subsequently, the wearable device 200 can make an NFC payment using the information displayed on the screen, in particular, the balance charged to the account of the electronic wallet (SE, Secure Element). In this instance, even when there is no information relating to the payment method in the wearable device 200, the NFC payment function can be conducted using an amount of money charged to the second terminal.

Here, the wearable device and the second device are "linked" to each other previously or as a predetermined gesture is sensed. Specifically, the wearable device and the second device being linked to each other means a connected state in which the wearable device 200 and the second terminal are connected with each other so that the wearable device 200 can access the account of the electronic wallet (SE, Secure Element) equipped in the second terminal.

Such connected state is hereinafter referred to as "linked" between the wearable device and the second device in order to be distinguished from typical connection between devices to communicate data therebetween. In other words, the connection for typical data communication between the wearable device and the second terminal is referred to as 'pairing,' and such pairing may be distinguished from the above-described "linking" or "linkage." For example, even when the wearable device is already paired with the second terminal, when the above-described preset user gesture is sensed, it may be referred to as 'linked' between the wearable device 200 and the second terminal, and in such case, the electronic wallet (SE, Secure Element) equipped in the second terminal may be accessed.

Meanwhile, in order for the user to know whether the connection between the wearable device and the second terminal is pairing for typical data communication or linkage for accessing the electronic wallet (SE, Secure Element), different feedbacks respectively corresponding to the pairing and the linkage may be output. Further, there may be different user gestures (motions) set in preset manners or set by the user. However, the present invention is not limited thereto, and in another embodiment, the user gesture may be implemented as any one of a preset touch input and a preset voice command.

In addition, the preset user gesture may be an intuitive user gesture for receiving information relating to the account of the electronic wallet (SE, Secure Element) from the second terminal and may be determined as default as the product is released or through the user's configuration. Also, the electronic wallet (SE, Secure Element) equipped in the second terminal may mean a payment method (e.g., an IC card or USIM) that may perform a payment function through communication with an external server. Meanwhile, the SE (Secure Element) denotes a sort of security region that may securely retain critical data such as financial information, authentication information, or service applications, and as the SE, a USIM (Universal Subscriber Identity Module), a micro SD, a sticker, or an embedded SE is frequently used.

In such case, the user can conduct a function that may be achieved by cash, credit card, point card, or transportation card, through the second terminal without separately carrying cash, credit card, point card, or transportation card. Such function includes, e.g., a finance-related function, and the finance-related function may mean, e.g., a mobile banking function including bank transaction or credit card transaction, a transportation card function ("K-merc™"), and a function of accumulating or using the points. Further, the finance-related function may mean a payment function that is conducted through a near-field wireless communication with a card terminal via the wireless communication unit of the second terminal.

Further, the account of the electronic wallet SE may be pre-registered, mapped with at least one of a virtual account, an actual account, a prepaid card, a deferred payment card, and a mobile phone payment account. Accordingly, the information relating to the account of the electronic wallet SE is the concept that includes all of the user information, charged balance, and transaction history of the registered account.

Also, the NFC payment is to perform payment through contactless, near-field wireless communication that adopts a frequency band of 13.56 MHz, and for example, refers to a payment scheme that adopts the technique in which data transmission is done between NFC chip-equipped terminals within a short distance of about 10 cm. NFC has good accessibility, bi-directionality, and security as compared with other techniques and provides for quick recognition (1/10 sec or less) without the need of a complicated pairing process. Accordingly, NFC is currently in wide use for, e.g., card payment, transportation card, transmission of travel information, and locks for traffic and access control. The above-mentioned various NFC functions are basically performed while the mobile terminal stays powered on.

Figure 3:
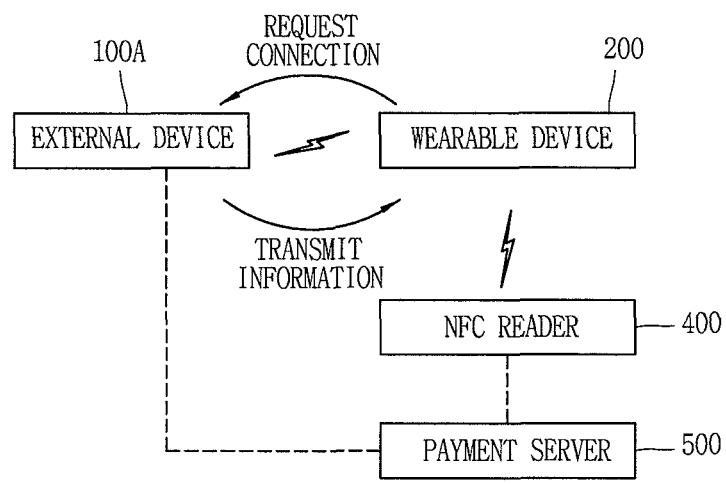
FIG. 3 is a view illustrating a payment system using a wearable device according to an embodiment of the present invention.

Next, FIG. 3 is a view illustrating a payment system using a wearable device according to an embodiment of the present invention. As shown in FIG. 3, the payment system may include a wearable device 200, a second terminal 100A, an NFC reader 400, and a payment server 500.

The wearable device 200 performs the operation for executing NFC payment according to an embodiment of the present invention, as the wearable device 200 comes in close contact with the NFC reader 400 while linked with the second terminal 100A. In this instance, the payment amount corresponding to the NFC payment is actually deducted from the account of the electronic wallet equipped in the second terminal 100A linked with the wearable device 200.

The payment server 500 is connected with the second terminal 100A and checks the balance and the account of the electronic wallet equipped in the second terminal 100A and deducts the payment amount. At this time, the payment amount to be deducted is provided in such a way that the wearable device 200 delivers the information read out from the NFC reader 400 to the second terminal 100A. Further, the payment server 500 performs a payment process by settling the deducted payment amount with the balance of a franchise account.

The NFC reader 400 comes into close contact with the wearable device 200 to communicate data with the wearable device 200. For example, if the wearable device 200 comes within a few centimeters (cm) to a few tens of centimeters (cm) of the fixed NFC reader 400, the NFC reader 400 delivers franchise information and payment information to the wearable device 200, and the wearable device 200 provides corresponding payment-related information.

For example, the wearable device 200 reads the tag attached or output to the NFC reader 400 to obtain the franchise information. Here, the tag may be an electronic tag such as an RFID tag or an NFC tag or N-dimensional code such as a QR code or a barcode. Further, the tag may be attached to a particular position—for example, an entrance or position adjacent to the wearable device 200 and such tag information may be output through an output means connected with the wearable device 200.

Although as described above in connection with FIG. 3, the obtaining of the franchise information and tagging for NFC payment are conducted through the wearable device 200 in the payment system according to an embodiment of the present invention, the actual deduction of payment amount is performed through the second terminal 100A linked with the wearable device 200. Accordingly, the user can easily use the electronic wallet equipped in the second terminal 100A through the wearable device 200 linked with the second terminal 100A even without a separate registration process.

Figure 4:
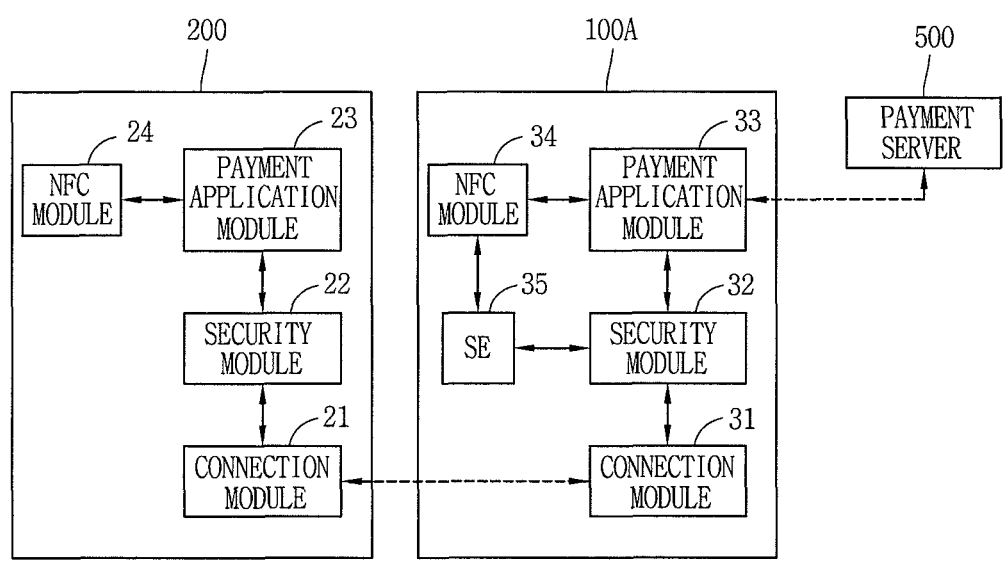
FIG. 4 is a view illustrating an example in which a wearable device is linked with an electronic wallet-equipped second terminal according to an embodiment of the present invention.

Next, FIG. 4 is a view illustrating an example in which a wearable device is linked with an electronic wallet-equipped second terminal according to an embodiment of the present invention. As shown in FIG. 4, the electronic wallet SE is equipped only in the second terminal 100A but not in the wearable device 200.

As shown in FIG. 4, the wearable device 200 can include a connection module (connection manager) 21, a security module (security agent) 22, a payment application module (payment App.) 23, and an NFC module 24. The connection module 21 is a component for performing linkage with a preregistered second terminal 100A. Such 'linkage' is distinguished from access for communicating data with the second terminal 100A as described above, and is the state in which the electronic wallet SE equipped in the second terminal 100A may be accessed.

Further, the security module 22 is a component for allowing for safe data communication between the wearable device 200 and the second terminal 100A linked with each other. In particular, because security is critical in the finance-related information such as the amount of money charged to the electronic wallet SE or user information, the finance-related information may be subjected to encryption and decryption through the security module.

Further, the payment application module 23 is an application that runs in the background of the main body for the wearable device 200 to be linked with the second terminal 100A, and the payment application module 23 can be activated through a predetermined input (a preset user gesture to be described below in greater detail). The NFC module 24 is a component for tagging the NFC reader to perform NFC payment. The NFC module 24 receives an NFC signal (i.e., a payment request signal), for example, as the wearable device comes in close contact with the NFC reader, and in response to the NFC signal, sends corresponding payment information.

Further, the second terminal 100A linked with the wearable device 200 includes similar components to those described above, such as a connection module (connection manager) 31, a security module (security agent) 32, a payment application module (payment App.) 33, and an NFC module 34. Also, the second terminal 100A includes one or more electronic wallets SEs 35.

The second terminal 100A remains linked with the wearable device 200 until the NFC payment is complete. As such, the second terminal 100A receives payment information and information on the franchise where the tagging has been done by the wearable device 200 from the wearable device 200 by maintaining the link and sends to the wearable device 200 payment amount information corresponding thereto.

In this instance, rather the amount of money charged to the electronic wallet 35, itself, only the information relating to the account of the electronic wallet SE, for example, amount information, is transmitted from the second terminal 100A to the wearable device 200. In other words, actual NFC payment is achieved through the second terminal 100A, but not through the wearable device 200. However, the user can immediately check the information on the balance charged to the electronic wallet 35 through the wearable device 200 and conducts NFC payment using the checked balance information. Accordingly, the user can feel convenient as if the amount of money was transmitted from the linked second terminal 100A (no need for a separate operation for transmission).

The user can also directly perform NFC payment through the NFC module 34 equipped in the second terminal 100A. Further, the second terminal 100A is connected with the payment server 500, and the payment server 500 deducts the NFC payment amount provided through the wearable device 200 from the account of the electronic wallet equipped in the second terminal 100A. That is, the payment application module 33 in the second terminal 100A is activated, and a corresponding payment application is run in the background to notify an amount to be deducted/amount deducted to the payment server 500.

In addition, the wearable device 200 is not directly connected with the payment server 500 and communicates information with the payment server 500 via the second terminal 100A. According to an embodiment of the present invention, the linkage between the wearable device 200 and the second terminal 100A and the connection to the second terminal 100A and the payment server 500 should be performed intuitively and quickly.

Figure 5:
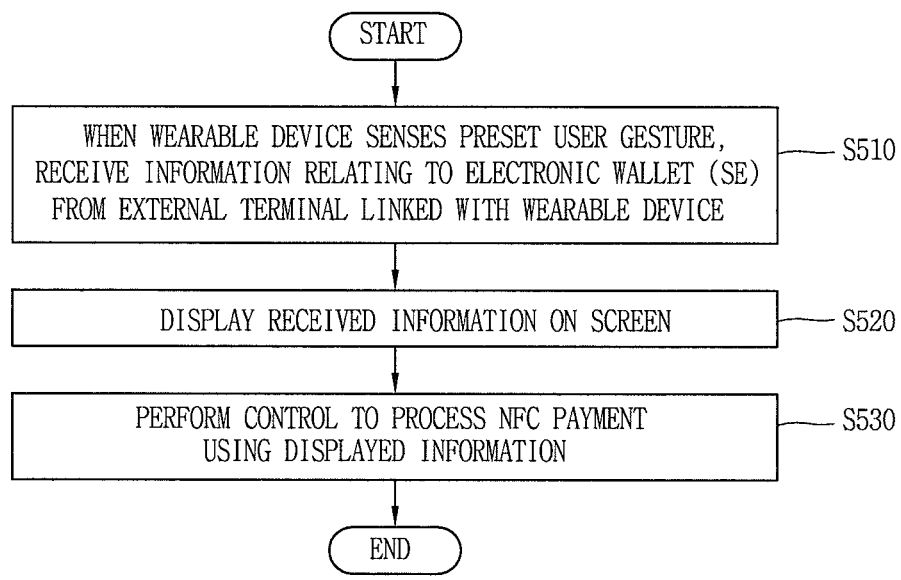
FIG. 5 is a flowchart illustrating an example method of operating a wearable device according to an embodiment of the present invention.

In particular, FIG. 5 is a flowchart illustrating an example method of operating a wearable device according to an embodiment of the present invention, and FIG. 6 is a concept view illustrating the flowchart shown in FIG. 5. First, referring to FIG. 5, the wearable device, e.g., a watch-type terminal, senses a preset user gesture while placed on a particular portion of the user's body (S510).

Here, the preset user gesture may be sensed through a combination of one or more of an acceleration sensor, a magnetic sensor, a G-sensor, a gyroscope sensor, and a motion sensor disposed on at least a portion of the main body 201 or the band 202 for sensing the gesture of the user wearing the main body. For example, the preset user gesture may be a gesture by which the touchscreen provided in the wearable device is rotated to be positioned to an outer side of the body and is then rotated back to an inner side of the body, with the arm wearing the wearable device stretched (such motions may be split as will be described below or may be treated as a single continuous motion). However, the gesture is not limited thereto, and the gesture may be determined or varied as a particular motion desired by the user.

If a preset user gesture is sensed, the wearable device receives information relating to the account of the electronic wallet (SE, Secure Element) from the second terminal linked with the wearable device and equipped with one or more electronic wallets (SE, Secure Element). Here, the "second terminal" means an external device pre-registered in the wearable device or the second terminal. Further, as described above, the wearable device and the second terminal are linked with each other previously or as a preset gesture is sensed. Specifically, the wearable device and the second terminal being "linked" means a connected state in which the wearable device 200 and the second terminal are connected with each other so that the account of the electronic wallet (SE, Secure Element) equipped in the second terminal may be accessed.

In other words, the connection for typical data communication between the wearable device and the second terminal is referred to as 'pairing,' and such pairing may be distinguished from the above-described "linkage." For example, even when the wearable device is already paired with the second terminal, when the above-described preset user gesture is sensed, it may be referred to as 'linked' between the wearable device 200 and the second terminal, and in such case, the electronic wallet (SE, Secure Element) equipped in the second terminal may be accessed.

In order for the user to know whether the connection between the wearable device and the second terminal is pairing for typical data communication or linkage for accessing the electronic wallet (SE, Secure Element), different feedbacks respectively corresponding to the pairing and the linkage may be output. Further, the "linkage" between the wearable device and the second terminal may be conducted when a user gesture is sensed or through a previous input. In the former case, if a preset user gesture is sensed, the controller of the wearable device may send a signal to request the "linkage" and a signal to request transmission of information corresponding to the account of the electronic wallet (SE, Secure Element) to the second terminal.

Also, the preset user gesture is a gesture input applied to the main body while the wearable device is placed on the user's body, and the user gesture may be a predetermined user gesture, a gesture set by the user or a gesture varied by the user. In another embodiment, rather than the preset user gesture, the implementation may be made by any one of a preset voice command and a preset type of touch input, rather than the user gesture.

The controller can also recognize the sensing of the preset user gesture as input of a control command to request the "linkage" with the pre-registered second terminal. In this instance, the wearable device and the pre-registered second terminal may have been already paired or might not be connected with each other. In either case, when a response corresponding to a control command to request the "linkage" is received, the electronic wallet (SE, Secure Element) equipped in the second terminal may be accessed.

Further, as used herein, the electronic wallet (SE, Secure Element), as described above, means a payment method (e.g., an IC card, USIM (Universal Subscriber Identity Module), micro SD, sticker, embedded SE, etc.) that can perform a payment function through communication with an external server. Further, as described herein, the information relating to the account of the electronic wallet includes all of information such as the transaction history, charged balance, and the user information of the account registered in at least one of a virtual account, an actual account, a prepaid card, and a mobile phone payment account, as well as the points and amount of money pre-charged to the prepaid card.

In other words, according to an embodiment of the present invention, the wearable device that does not store (or wearable device that selectively stores) payment method or payment method information may be linked with the second terminal storing one or more payment methods. If the wearable device is linked with the second terminal, the wearable device 200 and the second terminal may be connected with each other, so that the electronic wallet (SE, Secure Element) equipped in the second terminal can be accessed.

Once the wearable device and the second terminal were previously paired with each other, the pairing may be maintained by way of low-power wireless communication (e.g., BLE (Bluetooth Low Energy) communication), so that the above-described "linkage" can be conducted more quickly. As used herein, the "BLE communication" allows for wireless communication using low power (e.g., about 1 to 5% of the power required for the Bluetooth communication standards) while maintaining stability and security as the merits of the Bluetooth communication.

Even when the communication state between the wearable device and the second terminal is switched from the low-power wireless communication (BLE, Bluetooth Low Energy) to the Bluetooth (BT) communication or Wi-Fi communication to allow for access to the account of the electronic wallet (SE, Secure Element) equipped in the second terminal as a preset user gesture is sensed, such situation may belong to the above-described "linkage" as well.

Further, because the wearable device according to an embodiment of the present invention senses application of a preset user gesture while placed on a particular portion of the user's body, the wearable device can steadily receive the user's biometric information (e.g., pulse rate, etc.) as the user puts on the wearable device. Accordingly, it may be previously identified whether the person wearing the wearable device is the user himself, and the pre-registered second terminal may be previously identified (in other words, broadcasting for generating a list of pre-registered second terminals may be skipped).

As described above, when the access to the linked second terminal is performed through a preset gesture input, it is preferred to do so by a more intuitive gesture. In other words, the user can previously register, for future use, his or her own gesture or a gesture that allows the user to remind the "linkage" in more intuitive fashion. Further, the above-described preset user gesture may include two distinguished inputs from each other: an input for "linkage" with the second terminal (hereinafter, "first user gesture") and another input for transmitting and displaying information relating to the 'electronic wallet (SE)' account of the second terminal (hereinafter, "second user gesture") to be distinguished from each other or may be recognized as a single continuous user gesture.

For example, referring to FIGS. 6(a) and (b), when while the watch-type terminal 200 is placed on the user's wrist, the user makes the gesture of stretching his arm with his wrist rotated in the direction away from his body, the gesture of rotating his wrist in the direction away from his body with his arm stretched, or the gesture of rotating his wrist in the direction away from his body while simultaneously stretching his or her arm, and such gesture (hereinafter, referred to as a "first user gesture") is sensed, the linkage with the second terminal 100A may be conducted. Then, the watch-type terminal 200 turns into the state where the watch-type terminal 200 can access the electronic wallet (SE) equipped in the second terminal 100A.

This is similar to the user gesture for bringing the payment method in close contact with the NFC reader, and such intuitive gesture allows the "linkage" to be smoothly done. Thus, the sensing unit of the watch-type terminal 200 can sense the motion or rotation of the user's wrist while the main body is placed on the user's wrist. More specifically, the sensing unit can sense the motion of the wrist and the direction and degree of the rotation of the wrist through a combination of the information sensed through at least one or more of an acceleration sensor, a magnetic sensor, a G-sensor, a gyroscope sensor, and a motion sensor. Then, the controller can generate a "linkage" request signal based on the sensed wrist's motion and the direction and degree of the wrist's rotation and send the linkage request signal to the second terminal.

Further, the sensing unit can sense the wrist's rotation and motion of tendons passing through the wrist. In such case, the controller can run a corresponding control operation (e.g., access to the second terminal) based on the characteristics of the sensed rotation of the wrist's motion and the motion of the tendons passing through the wrist. Thus, the controller can enable execution of the control operation (e.g., access to the second terminal) corresponding to the motion characteristics of the tendons passing through the user's wrist only when sensing a preset starting gesture.

Further, the controller can set a condition that the first user gesture applied to the main body is maintained for a preset time (e.g., 1 sec or more). In other words, the controller can previously set a predetermined time condition so that the main body recognizes that the first user gesture is intended to perform the "linkage" with the second terminal. The controller can also distinguish the linkage corresponding to the above-described first user gesture (i.e., access for NFC payment) from other types of access, for example, pairing.

Specifically, if the linkage corresponding to the first user gesture is performed, the second terminal 100A is activated to gain wireless access to the payment server 500, and the payment application installed in the second terminal 100A may be automatically executed. In contrast, when the access for typical communication of data or content between the watch-type terminal 200 and the second terminal 100A, for example, pairing, an access request signal distinguished from the Bluetooth signal corresponding to the first user gesture is transmitted to the second terminal 100A to prevent the second terminal 100A from accessing the payment server 500.

If the wearable device senses the first user gesture, the watch-type terminal 200 may output different types of feedback depending on whether the "linkage" with the second terminal succeeds. In this instance, the types of feedback depending on whether the "linkage" succeeds may be implemented by combining at least one or more of a vibration, a sound, and a screen change on the touchscreen.

For example, if the watch-type terminal 200 is linked with the second terminal 100A, as shown in FIG. 6(b), a feedback indicating that the linkage such as a predetermined vibration can be output from the main body of the watch-type terminal 200. Thus, the watch-type terminal 200 may have different two vibrations patterns installed therein, which include respectively a vibration pattern (e.g., multiple times of vibration) corresponding to the success of the pairing and another vibration pattern (e.g., a single time of vibration) corresponding to the failure of the pairing. Further, such feedback may be output from the second terminal 100A as well.

Upon success of the linkage with the second terminal 100A, the second terminal 100A can switch to the ON state or activated state. As described above, the payment application can be run in the background to access the payment server 500. If a preset user gesture, i.e., the second user gesture (e.g., the gesture of bringing the touchscreen of the watch-type terminal 200 to the inside of the user's body) is sensed by the watch-type terminal 200 while the watch-type terminal 200 linked with the second terminal, the watch-type terminal 200 can receive information relating to the account of the electronic wallet (SE) from the linked second terminal.

In this instance, the first user gesture and the second user gesture may be required as a condition to be performed within a predetermined interval. For example, unless the second user gesture is sensed in a predetermined time after the first user gesture has been performed, the "linkage" between the watch-type terminal 200 and the second terminal may be released.

Next, the wearable device displays on the screen the information relating to the account of the electronic wallet (SE) received from the linked second terminal (S520). Here, the information relating to the account of the electronic wallet includes all of the information on the transaction history and charged balance, and user information of the account registered in at least one of the virtual account, actual account, prepaid card, and mobile payment account issued from a financial organization, as well as the points and pre-charged amount of money to the prepaid card, as described above.

The controller can recognize sensing the above-described preset user gesture as input of a control command for identifying the information on the balance charged to the linked second terminal. For example, referring to FIGS. 6(b) and (c), upon sensing the gesture of rotating the user's wrist back to the inside of his body with the control operation (linkage with the second terminal) corresponding to the first user gesture running on the watch-type terminal 200, a control command corresponding to the second user gesture (i.e., receiving the balance information from the second terminal 100A and displaying the received balance information) is executed.

In other words, if the touchscreen 251 of the watch-type terminal 200 is oriented back to the user (to the inside of the user's body), the user can immediately verify the balance information of the second terminal 100A displayed on the touchscreen 251. A sign 602 (e.g., 'terminal 1') for identifying the linked second terminal and the balance information 601 (e.g., 'balance: KRW 20,000) received from the linked second terminal are output on the touchscreen 251 of the watch-type terminal 200. In this instance, the sign for identifying the second terminal may be output as a thumbnail image of the terminal, and the received balance information may be output as the numbers and a note image corresponding to the amount of money. Further, the received balance information may be offered as a sound (e.g., a sound saying "the balance is KRW 24,000.") instead of being output on the screen.

Further, the controller of the wearable device, if determining that the level of the received balance information (e.g., the amount of money, points) is less than a preset level (e.g., the minimum amount of money, minimum points), may encourage the user to charge the balance by providing an highlighting effect (e.g., flickering, other colors, or changing size) to the balance information displayed on the touchscreen 251 so as to be visually distinguished or through vibration or sound.

Specifically, when the level of the balance information displayed on the touchscreen 251 is less than the preset level (e.g., KRW 1,000 or less), the controller can output on the touchscreen 251 guide information to encourage the user to perform a money charging process through the linked second terminal. As another example, such guide information may be output in the form of a voice guide (e.g., a voice saying "money charging is required," or "please charge the balance through terminal.") or a preset sound (e.g., a beeping sound), or vibration.

If the user responds to the request for balance charging (e.g., performing entry to the balance charging key activated on the touchscreen 251), the controller can send to the linked second terminal a control command to immediately execute the application for performing a money charging process on the linked second terminal. If the money charging is complete on the second terminal, a result of the charging may be immediately sent to the wearable device, and a corresponding feedback (e.g., a voice saying "money charging has been complete.") may be output through the touchscreen 251 or the sound output unit.

Next, the wearable device performs an operation to process the NFC (Near Field Communication) payment using the information displayed on the display unit 251 (S540). Specifically, if the user brings the wearable device 200 in close contact with the NFC reader 400 (as shown in FIG. 3) with the information displayed on the displaying unit 251, the franchise information and the payment information are received and are sent to the linked second terminal 100A. Thus, the NFC module of the wearable device 200 should be activated before coming in close contact with the NFC reader 400. For example, when the above-described preset user gesture is sensed on the main body, the NFC module may be activated.

Then, the second terminal 100A may perform actual payment in interoperation with the pre-connected payment server 500 and deducts the payment amount from the electronic wallet (SE). A result of the payment process is provided to the wearable device 200, and the information on the balance remaining after the payment amount has been deducted is displayed on the screen of the wearable device 200 (S530). In this instance, the user does not perform any other action associated with the payment process than only the user gesture for linkage with the second terminal and the gesture of bringing the wearable device in close contact with the NFC reader in order to perform NFC payment.

As a result, as shown in FIG. 6(d), the payment amount information (e.g., 'payment amount: KRW 1,000') tagged through the NFC reader 400 is displayed on a first region 603 of the touchscreen 251 in the wearable device 200 and balance information (e.g., 'balance KRW 23,000') obtained by deducting the payment amount is displayed on a second region 604 of the touchscreen 251. Further, the controller notifies the linked second terminal 100A that the NFC payment has been complete. To save power, the linkage between the wearable device and the second terminal may be switched to the release state or the communication state may be varied differently (e.g., a switch may be made from BT/Wi-Fi to low-power wireless communication (BLE)).

A specific embodiment in which the wearable device performs NFC payment through linkage with the second terminal has been described above. In the embodiment, even when there the wearable device does not retain any information relating to the payment means, the NFC payment function may be conducted using the amount of money charged to the linked second terminal, thus providing for user convenience.

According to an embodiment of the present invention, the "linkage" between the wearable device and the second terminal is limited to the wireless access for performing NFC payment. Thus, other types of access (e.g., mere data sharing between the wearable device and the second terminal) are preferably distinguished from the linkage. Further, according to an embodiment of the present invention, the valid "linkage" between the wearable device and the second terminal needs to be maintained until the NFC payment is complete. Accordingly, if the "linked" state between the wearable device and the second terminal is varied while the NFC payment function is in execution, the user should be provided with a feedback corresponding thereto.

Figure 7A:
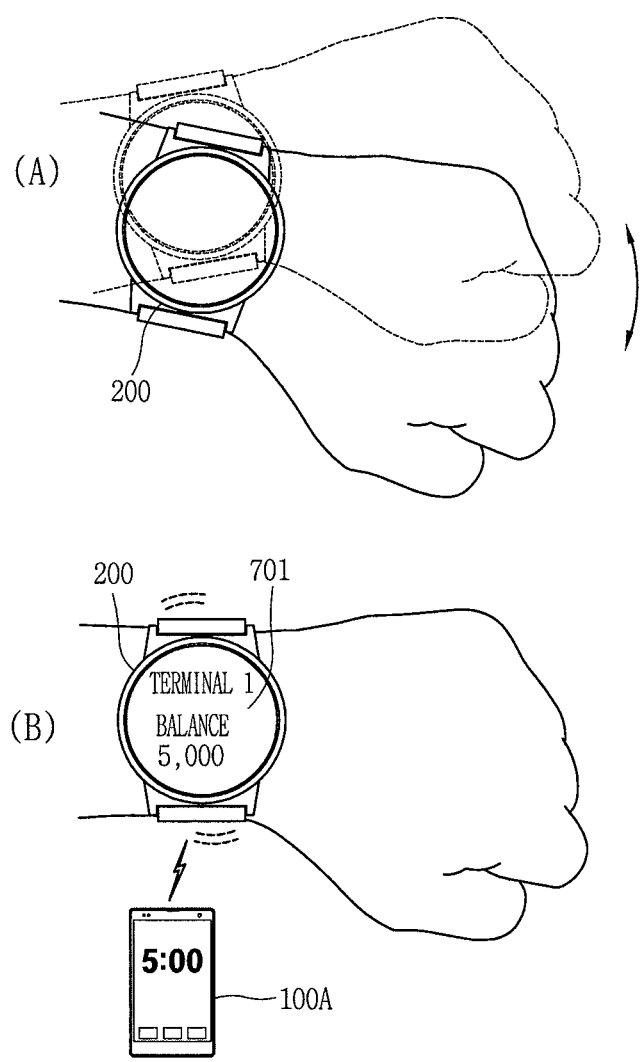
FIGS. 7A and 7B are concept views illustrating a method by which a wearable device is linked with a second terminal through a plurality of touch inputs or a gesture input, according to an embodiment of the present invention.
Figure 7B:
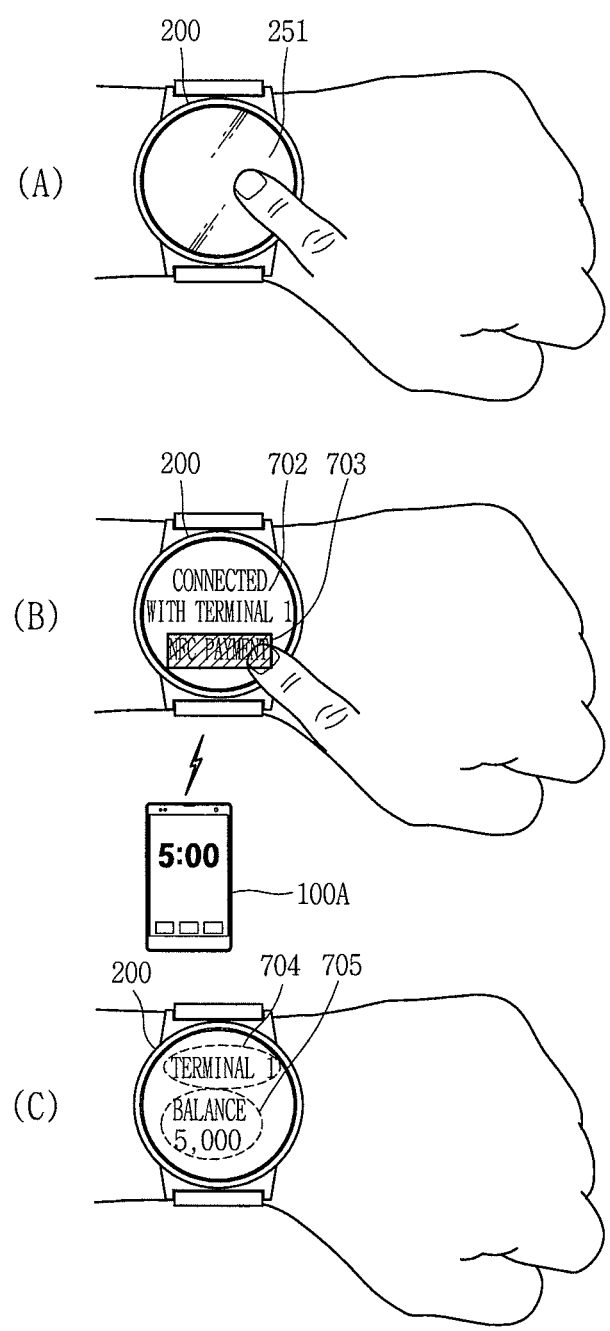

Regarding this, FIGS. 7A and 7B are concept views illustrating a method for performing linkage for NFC payment through, among others, a gesture input and a touch input for linking the wearable device with the second terminal according to an embodiment of the present invention. The controller 280 of the wearable device 200, when a first user gesture is sensed, attempts to link with a pre-registered second terminal for NFC payment, and as a result, may output a feedback corresponding to success or failure of the linkage.

In addition, the type of feedback that can be out is not limited to a particular one. For example, the feedback that can be output may include displaying an icon to indicate whether to gain access, a voice, a vibration, a change in LED display, and a combination of one or more thereof. Further, the sensing unit of the wearable device 200 can sense different user gestures, rotation of the main body in different directions, or a biometric signal sensed while placed on the main body and send the sensed result to the controller. The controller can recognize application of the above-described preset user gesture based on the sensed result. For that purpose, the sensing unit may sense the preset user gesture through a combination of one or more of an acceleration sensor, a magnetic sensor, a G-sensor, a gyroscope sensor, and a motion sensor.

Meanwhile, the above-described user gesture may be limited to a particular gesture previously registered by the user in order to enforce security. To that end, the user can enter the NFC gesture registration mode in response to a preset input to register and vary the preset user gesture. For example, the gesture of the user stretching his arm, rotating the touchscreen in the direction away from his body, and then rotating back to the inside of his body has been described above as an example of the preset user gesture. However, when the wearable device does not sense a biometric signal to previously verify the user's identity, it may be arbitrarily used by a third party, and thus, it may suffer from vulnerable security.

Accordingly, the user can register and use his own user gesture in the above-NFC gesture registration mode. For example, when the wearable device is a watch-type terminal 200, the user can generate his own user gestures that have strong security by varying the number of times of rotation of his wrist or direction or combining a gesture with other inputs (e.g., a voice or saying a particular word, or sequential entry of multiple touch inputs on virtual regions on the touchscreen).

Further, if his own pre-registered user gesture is sensed and the wearable device and the second terminal are thus linked with each other to provide for NFC payment, a feedback (e.g., alert message or sound) corresponding to such linkage may be output from the second terminal as well. Further, the second terminal may display screen information that may allow for entry to release the linkage with the wearable device.

In such case, if the user applies an input to release the linkage with the wearable device using the displayed screen information, the linkage between the second terminal and the wearable device is immediately released, and a feedback indicating such release (e.g., a message or guidance voice saying "linkage has been released" or "want to re-attempt to link?") may be output from the second terminal and the wearable device. Further, the second terminal, upon release of the linkage with the wearable device, may supply a control command to maintain the paired state with the wearable device using the above-described screen information.

Meanwhile, the above-described preset user gesture may be implemented in various forms, and an operation for "linking" the wearable device with the second terminal, an operation for "receiving" information relating to the account of the electronic wallet (SE) from the second terminal, and an operation for "displaying" the received information relating to the account of the electronic wallet (SE) may be performed through each other or through one or two operations.

Specifically, when the first user gesture is sensed, the controller performs "linkage" between the wearable device and the second terminal, and when the second user gesture is sensed, the controller can "receive" and "display" the information relating to the account of the electronic wallet (SE) from the second terminal. Or, when a preset user gesture is sensed, the controller can "link" the wearable device with the second terminal, "receive" and "display" the information relating to the account of the electronic wallet (SE), or "receive" and "display" related information from a previously linked second terminal. Or, when the first user gesture is sensed, the controller can perform "linkage" between the wearable device and the second terminal, when the second user gesture is sensed, may "receive" the information relating to the account of the electronic wallet (SE) from the second terminal, and when a preset touch input is applied to the touchscreen 251, may display the received information on the touchscreen 251.

For example, as shown in FIG. 7A (a), upon sensing the gesture of repeatedly rotating the user's wrist right and left by a preset number of times (e.g., two times) with the watch-type terminal 200 placed on the user's wrist, the "linkage" between the wearable device and the second terminal may be performed. In other words, if the user's wrist wearing the watch-type terminal 200 is rotated right and left two times or more, the controller 280 can recognize it as an access request for NFC payment.

Accordingly, the linkage with the pre-registered second terminal 100A is performed, and the payment application is run in the background of the second terminal 100A, thus allowing for access to the payment server 500. Further, the NFC module of the watch-type terminal 200 may be activated. Further, the controller can output a feedback corresponding to whether the "linkage" with the second terminal succeeds in response to sensing the gesture input. As used herein, the feedback may include a combination of one or more of a vibration, a sound, and a screen change on the touchscreen. Specifically, for example, when the linkage between the main body and the second terminal fails, the controller can output a first vibration (e.g., a short-duration vibration) to indicate that the linkage failed.

In addition, visual information to indicate the cause for the linkage failure (e.g., communication failure, insufficient battery, closure of the electronic wallet (SE) account, etc.) may be displayed on a region of the touchscreen 251. Further, upon success of the linkage with the second terminal, the controller can output a second vibration (e.g., a long-duration vibration lasting longer than 1 sec) different from the above-described first vibration to indicate that the linkage succeeded.

For example, as shown in FIG. 7A(b), if the watch-type terminal 200 is linked with the second terminal 100A by performing the user gesture shown in FIG. 7A(a), a predetermined vibration is output from the main body. Upon application of a user gesture of rotating to allow the touchscreen 251 to be oriented to the inside of the user's body (i.e., the second user gesture), the balance information 701 received from the second terminal 100A is displayed on the touchscreen 251.

As another example, if it is sensed through the sensing unit that the main body is rotated in a first direction, the controller can enable a control operation ("linkage") corresponding to the above-described first user gesture to be executed, and if it is sensed through the sensing unit that the main body is rotated in a second direction with the "linkage" with the second terminal achieved, may enable a control operation corresponding to the above-described second user gesture (receiving and displaying the information relating to the account of the electronic wallet (SE) equipped in the second terminal) to be executed.

Meanwhile, when the linkage with the second terminal is achieved through the gesture of rotating the touchscreen oriented in the direction away from the user's body, the touchscreen of the wearable device departs from the user's view, and thus, the output of feedback may be limited to a 'vibration' that allows the user to be aware of whether the "linkage" with the second terminal is achieved even without viewing the screen.

In addition, FIG. 7B illustrates an example in which access to the second terminal 100A is gained through predetermined multiple touch inputs on the touchscreen 251 of the wearable device 200. As shown in FIG. 7B (a), the controller can sense multiple touch inputs applied to the displaying unit with the displaying unit 251 of the watch-type terminal 200 deactivated. In this instance, the multiple touch inputs may include a plurality of tap inputs having a preset rhythm.

If the plurality of touch inputs having a preset rhythm are applied onto the touchscreen 251 remaining deactivated, the controller switches the touchscreen 251 to the activated state and may execute a control command for performing access for NFC payment, i.e., "linkage," with a corresponding second terminal 100A. Further, unless the plurality of touch inputs applied onto the touchscreen 251 match the preset rhythm (recognized as the operation to awaken), the controller switches the touchscreen 251 to only the activated state or may output on the touchscreen 251 the unlocked screen (e.g., idle screen, home screen, etc.) that is obtained as the locked state switches to the released state.

If the plurality of touch inputs applied to the 252 comply with the preset rhythm, as shown in FIG. 7B (b), visual information (e.g., a message saying "connected with terminal 1") 702 to indicate that the "linkage" with the second terminal 100A was done may be output on a region of the activated touchscreen 251, and an icon 703 inquiring about whether the NFC module of the main body is activated may be popped up. In addition, because the touchscreen 251 is oriented towards the user, a feedback corresponding to whether the "linkage" with the second terminal 100A succeeds may be output through the touchscreen 251.

In such circumstance, if the popped-up icon 703 is touched, the NFC module for NFC payment is activated, and a screen change occurs on the touchscreen 251 to display the balance information 705 received from the connected second terminal 100A, as shown in FIG. 7B(c).

In addition, FIG. 7C is a concept view illustrating a method by which a wearable device is linked with a second terminal through NFC according to an embodiment of the present invention. If the NFC module-equipped second terminal 100A comes in close contact with the watch-type terminal 200 as shown in FIG. 7C (b), with an icon 706 (e.g., 'NFC') indicating that the NFC function is activated on the displaying unit 251 of the watch-type terminal 200 as shown in FIG. 7C(a), the second terminal 100A and the watch-type terminal 200 are Bluetooth-linked with each other.

As a result, as shown in FIG. 7C(c), the balance information received from the second terminal 100A is displayed on the touchscreen 251 of the watch-type terminal 200. The controller can monitor the linkage with the second terminal 100A continuously or at a predetermined interval until the NFC payment is complete (that is, until the payment complete information is transmitted to the second terminal). Further, when the linkage with the second terminal 100A is switched to pairing for typical data communication or the communication network maintaining the linkage is changed to another network in response to the entry from the second terminal, the controller can output an alert so that the wearable device may recognize such case.

Further, when, as a result of the monitoring, the linkage is released before the NFC payment is complete, the controller can output a feedback to indicate such release and may output the cause of the release through the touchscreen 251 or through the sound output unit. When the NFC payment is complete but the linkage is released before the payment complete information is sent to the second terminal, the controller temporarily stores the payment complete information in the wearable device, and if relinked or paired with the second terminal 100A, the controller sends the temporarily stored payment complete information to the second terminal.

The NFC function for NFC payment should be activated at least before the wearable device 200 is brought in close contact with the NFC reader 400. According to an embodiment of the present invention, when the above-described preset user gesture is sensed or another preset input is sensed with the touchscreen 251 of the wearable device 200 deactivated, the NFC function of the wearable device may be activated.

For example, when the first user gesture is sensed, the NFC module of the wearable device may be activated simultaneously with the "linkage" with the second terminal. In other words, the controller can automatically activate the NFC module provided in the main body when the above-described first user gesture is sensed so that the "linkage" with the second terminal is successfully done or independently from such case.

By doing so, the user need not conduct a separate operation to activate the NFC function. That is, as already set forth above, once a predetermined input has been already done to link the wearable device with no electronic wallet with the second terminal, the user can immediately perform the NFC payment only by bringing the wearable device close to the NFC reader. For example, the present invention is particularly useful in the case where quick NFC payment is required like payment of bus fare.

As another example, when the wearable device is linked with the second terminal, the above-described second user gesture, i.e., rotating the touchscreen 251 to the inside of the user's body, is sensed or a portion of the touchscreen 251 is touched, the NFC payment function of the wearable device may be activated. If the NFC function of the main body is activated, the controller switches a region of the touchscreen 251 to the activated state and may output a feedback (e.g., an alert icon) corresponding to the activation of the NFC function on the region. In this instance, if the NFC module is switched to the deactivated state before the NFC payment is complete, the output alert icon may disappear or change to other shape, thus indicating that the NFC module is switched to the deactivated state.

Figure 8:
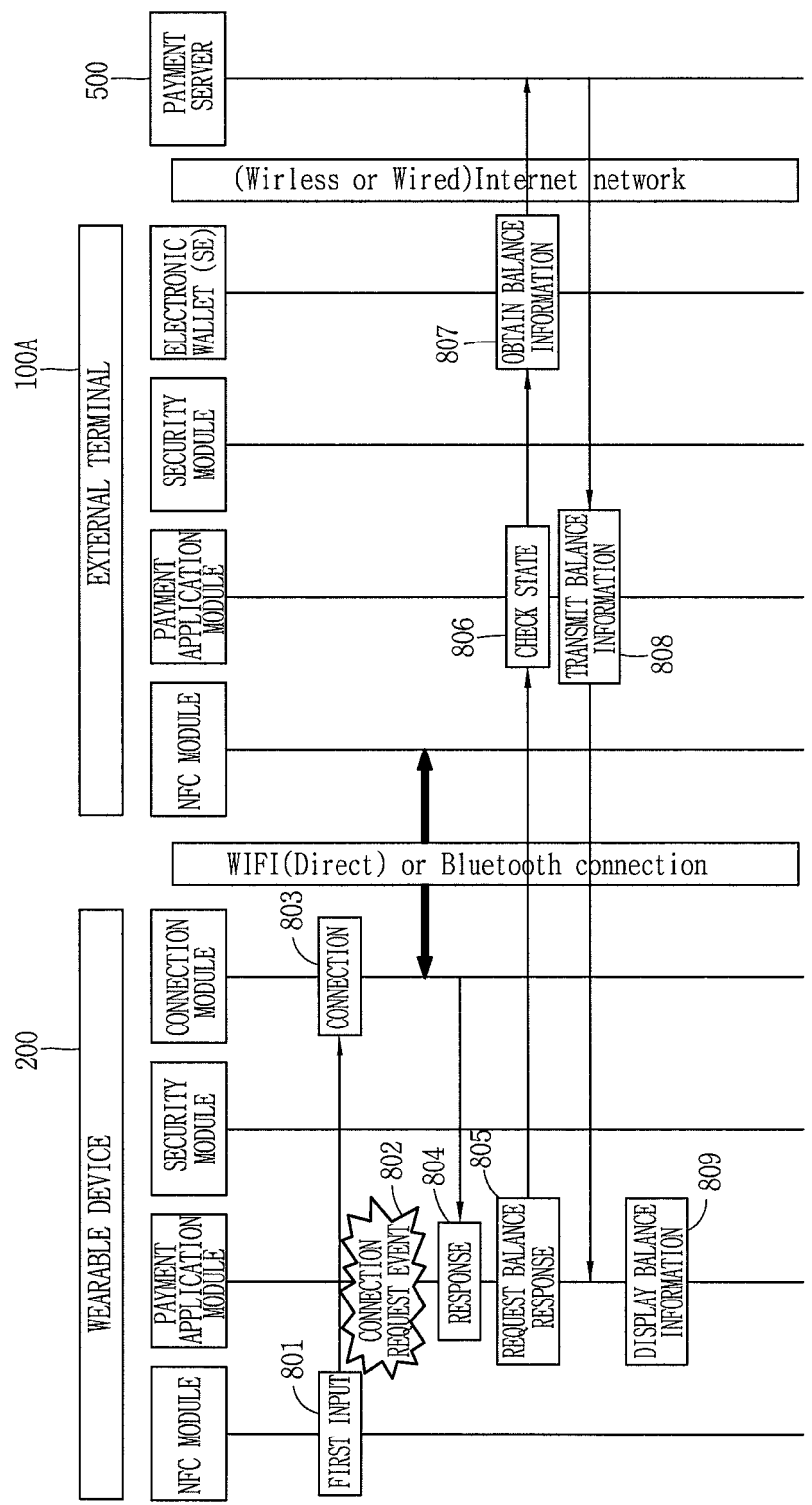
FIG. 8 is a flowchart illustrating a method by which a wearable device receives charged balance information from its linked second terminal according to an embodiment of the present invention.

Next, FIG. 8 is a flowchart illustrating a method by which a wearable device receives charged balance information from its linked second terminal according to an embodiment of the present invention. First, if a first input (a preset intuitive gesture, touch input, voice, NFC contact, etc.) is sensed from the wearable device 200 (S801), the payment application module 23 (FIG. 4) is automatically executed to indicate the occurrence of an event (a request for connection) (S802). Next, "linkage" with the second terminal 100A is attempted through the connection module 21 of the wearable device 200 (S803). Also, the linkage with the second terminal 100A may be achieved through Wi-Fi or Bluetooth (BT).

When receiving a response corresponding to the request for linkage through the connection module 31 of the second terminal 100A (S804), the wearable device 200 sends a request for transmitting balance information through the payment application module 23 (S805). Such request is encrypted through the security module 22 and is safely delivered to the second terminal 100A. When receiving the request, the security module 32 of the second terminal 100A checks the state of the terminal (S806). In other words, the operation state and battery state of the second terminal 100A, and state of the account of the electronic wallet (SE) are checked.

Next, the balance information of the electronic wallet (SE) 35 equipped in the second terminal 100A is obtained through the payment server 500 (S807), and the obtained balance information is encrypted through the security module 32 and is then transmitted to the wearable device (S808). Then, the wearable device displays the balance information on the touchscreen 251 of the wearable device 200 as a preset gesture (e.g., the gesture of rotating the touchscreen 251 to the inside of the user's body) is input (S809).

Accordingly, even when the wearable device includes no information relating to the payment means, the NFC payment may be immediately performed using the information on the balance charged to the connected terminal. For example, when the user tries to make the NFC payment on the fare of the bus on which he happened to ride in hurry, the user can achieve the linkage with the second terminal having an electronic wallet by a simple action without pulling out the wallet or terminal and can make the immediate NFC payment using the identified balance. Accordingly, the user can make quick payment on the fare without embarrassment.

As described above, the NFC payment of the wearable device according to an embodiment of the present invention presumes that the "linkage" with the second terminal and the "NFC function" are activated, at least. FIG. 9A is a concept view illustrating a method of controlling a subsequent operation when the connection between a wearable device and a second terminal fails according to an embodiment of the present invention.

If a first input (a preset intuitive gesture, touch input, voice command, or attempt to do NFC contact) is applied to the wearable device 200, a request for linkage is transferred to the second terminal 100A. When the linkage with the second terminal that receives the linkage request fails, the controller can output a feedback indicating the failure of the linkage, for example, a preset vibration or sound, to the main body.

If a second input, for example, the gesture of rotating the touchscreen 251 to the inside of the user's body, is sensed from the wearable device 200 or a region of the touchscreen 251 is touched, visual information indicating the cause of the failure of the linkage may be displayed on the region of the touchscreen 251. For example, upon sensing the gesture of the user rotating his wrist in the direction away from his body while stretching his arm in the direction away from his body, with the watch-type terminal 200 placed on the user's wrist as shown in FIG. 9A(a), "linkage" with the pre-registered second terminal 100A is attempted. In this instance, the linkage request signal corresponding to the sensed gesture may be distinguished from a typical pairing signal as described above. That is, the linkage request signal according to an embodiment of the present invention corresponds to a request for connection to perform NFC payment.

When receiving the linkage request, the second terminal 100A switches the screen of the second terminal from deactivated state to activated state and outputs preset screen information (e.g., home screen page or screen information output most recently). Further, upon reception of the linkage request, the second terminal 100A may check the state of the terminal and output the state information on the displaying unit. For example, as shown in FIG. 9A(a), a battery image 901 indicating being short of battery (e.g., battery power less than 2%) may be output on the displaying unit of the second terminal 100A.

Next, if the user makes the gesture of checking the touchscreen 251 by rotating the wrist wearing the watch-type terminal 200 to the inside of his body as shown in FIG. 9A(b), a feedback corresponding to whether to link with the second terminal is output on the touchscreen 251. FIG. 9A(b) shows an example in which as a feedback corresponding to the failure of the linkage with the second terminal, visual information 902 (e.g., a message saying "terminal 1 powered off and no response") indicating the cause of the failure of the linkage is output on the touchscreen.

If a first (a preset intuitive gesture, touch input, voice command, or attempt to do NFC connection) is sensed to attempt linkage with another terminal as shown in FIG. 9A(c), with a feedback corresponding to the failure or release of the linkage output, a terminal (e.g., glasses-type terminal) 200B registered second in the wearable device may be attempted for linkage. In this instance, the order in which a plurality of second terminals pre-registered in the wearable device are linked with the wearable device may be determined depending on the preset order of priority (e.g., in order of registration, user's preference, etc.), and such order may be varied through the user's input.

Also, when the linkage with the other second terminal 200B fails, if the user makes the gesture of rotating his wrist to the inside of his body to check the touchscreen 251 as shown in FIG. 9A(d), visual information 903 indicating the cause of the failure of the linkage with the second terminal 200B (e.g., disconnection between terminal 2 and communication network) shows up on the touchscreen 251.

Further, when linkage is attempted targeting the other second terminal 200B, if a predetermined number of times of tapping is entered onto the touchscreen 251 which outputs the cause of the failure of the linkage (which is recognized as a control command to cancel the operation executed most recently), and then the first input is made again, the linkage request signal may be re-sent to the second terminal 200B.

Figure 9B:
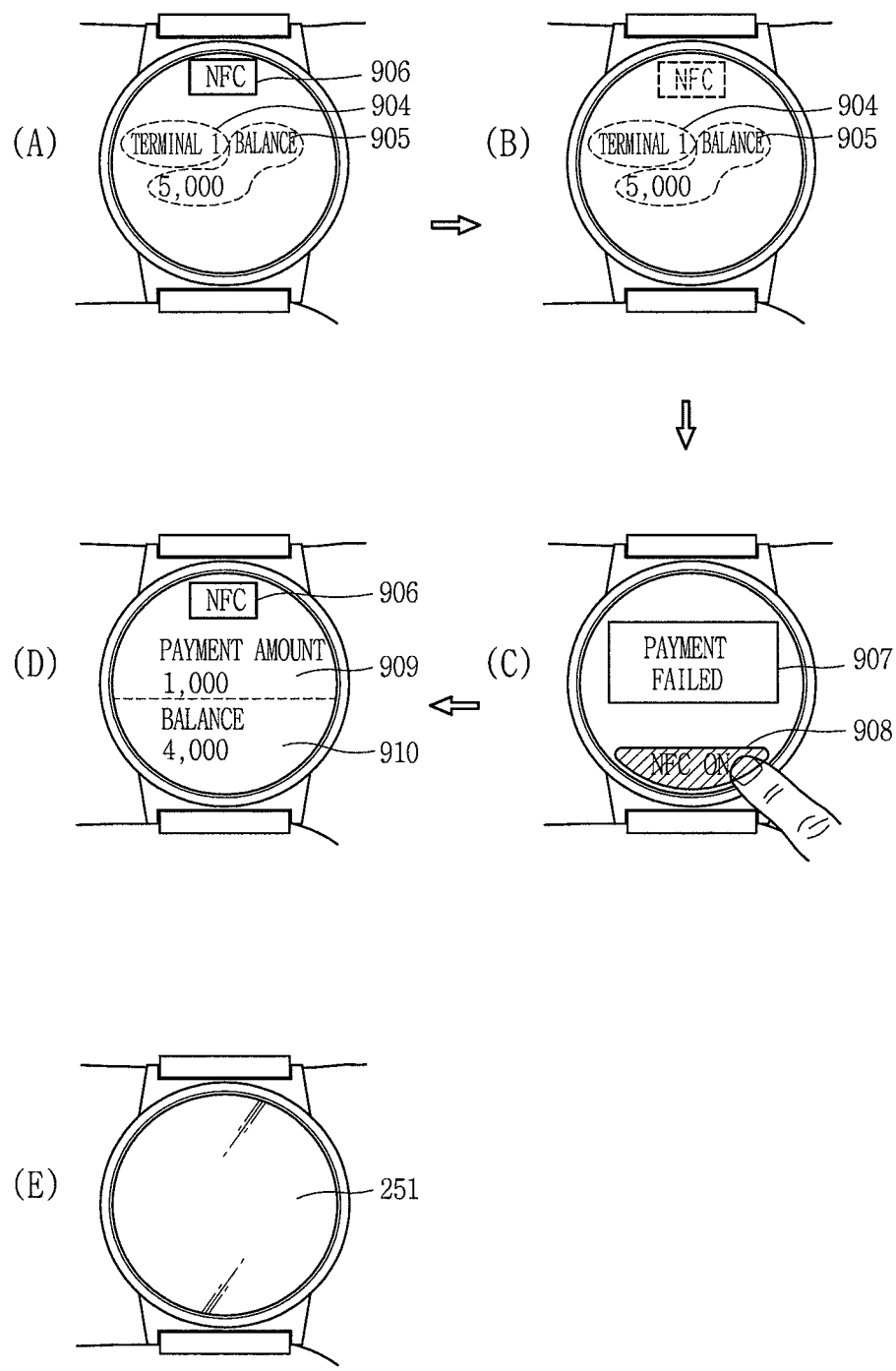
FIG. 9B is a concept view illustrating a processing method upon deactivation of an NFC payment function in a wearable device according to an embodiment of the present invention.

FIG. 9B is a concept view illustrating a method of controlling a subsequent operation in the case where, while NFC payment is made, the NFC payment function is switched to the deactivated state in a wearable device according to an embodiment of the present invention. If the linkage with the second terminal 100A is successfully done as the wearable device 200 senses the first input, the balance information (e.g., a message saying "terminal 1, balance KRW 5,000) 904 and 905 received from the second terminal 100A is displayed on a region of the touchscreen 251, and an icon 906 indicating activation of the NFC function may be displayed on another region of the touchscreen 251.

If the touchscreen 251 outputs the balance information 904 and 905 of the linked second terminal and the icon 906 indicating the operation state of the NFC function, the controller can check the time taken to perform close contact for NFC payment. For example, unless the close contact is conducted within a predetermined time (e.g., within a few seconds), the wearable device switches the NFC function to the deactivated state as shown in FIG. 9B(b) to make the icon 906 disappear. Or, the wearable device may make changes to the screen to display only the existing clock information on the touchscreen 251.

A few seconds after the icon 906 indicating the operation state of the NFC function is output on the touchscreen 251, if the watch-type terminal 200 is brought in close contact with the NFC reader, a message 907 indicating that the payment fails (e.g., a message saying "payment failed") pops up on a region of the touchscreen 251 as shown in FIG. 9B(c), and an icon for removing the cause of the failure, i.e., an icon 908 (e.g., "NFC ON?") for activating the NFC function is displayed on the screen.

If the watch-type terminal 200 is brought in close contact with the NFC reader while the NFC function is turned back to the activated state by the user's touch on the icon 908, a result of processing the NFC payment is displayed on the touchscreen 251 as shown in FIG. 9B(d). In other words, if after the watch-type terminal 200 is brought in close contact with the NFC reader, the gesture of rotating the touchscreen 251 to the inside of the user's body (i.e., the second user gesture) is sensed, the controller displays an NFC payment amount 909 (e.g., "payment amount KRW 1,000") on a region of the touchscreen 251 and updated balance information 910 (e.g., "balance KRW 4,000") on another region of the touchscreen 251.

A predetermined time (e.g., a few seconds) after the payment has been processed, the controller can switch the touchscreen 251 to the deactivated state as shown in FIG. 9B(e) and release the connection with the second terminal 100A or vary the communication state (e.g., switch the Wi-Fi/Bluetooth (BT) communication to the low-power wireless communication (BLE)) to minimize battery consumption. Alternatively, the controller can switch the currently output screen to the screen including the existing clock information while maintaining the activated state of the touchscreen 251 as described above.

Figure 10:
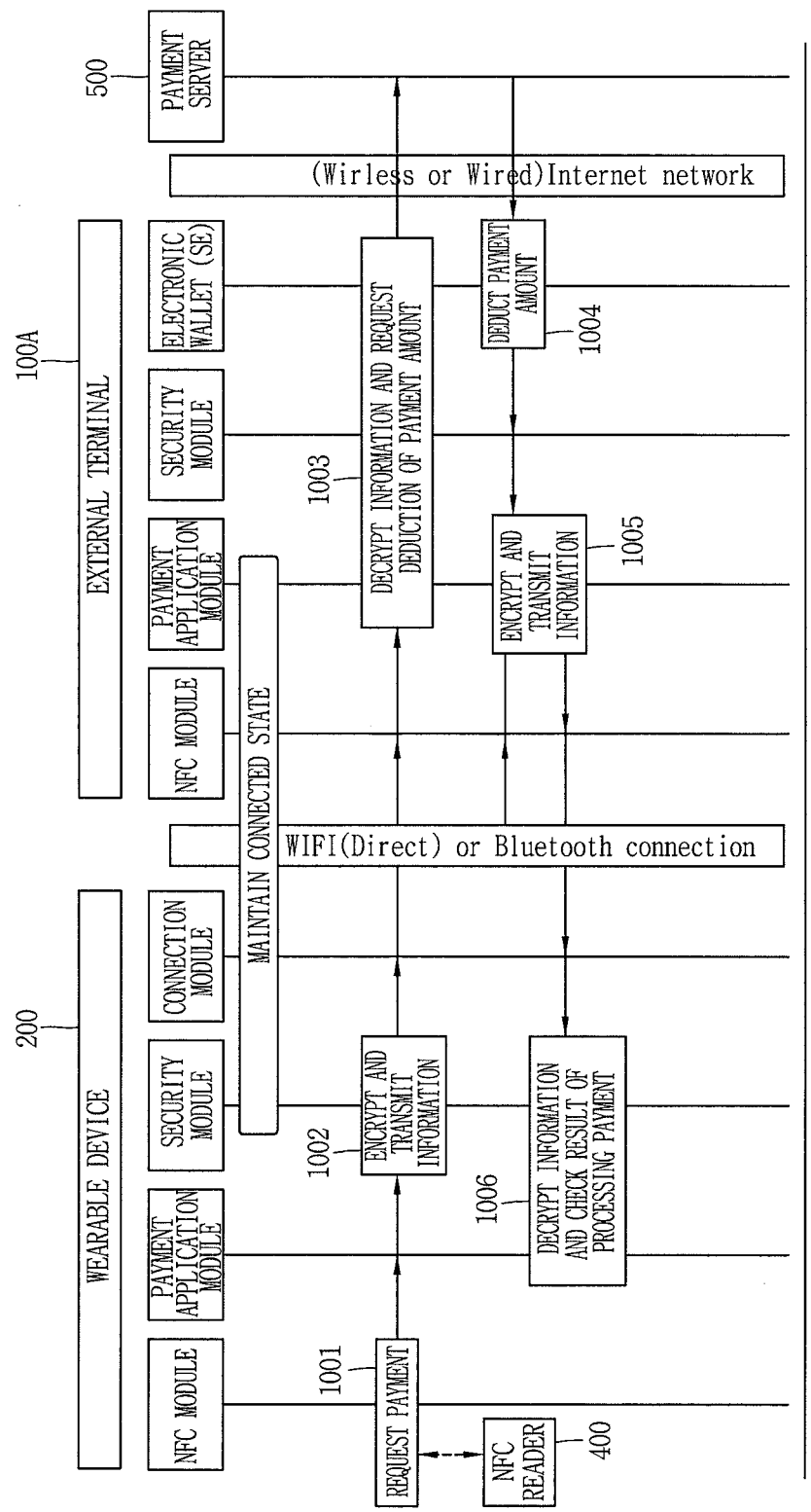
FIG. 10 is a concept view illustrating a procedure of processing payment using information received from a linked second terminal by an wearable device according to an embodiment of the present invention.

FIG. 10 is a concept view illustrating a method by which a wearable device performs actual payment using a second terminal linked through Wi-Fi or Bluetooth (BT) communication, according to an embodiment of the present invention. Referring to FIG. 10, as the wearable device 200 comes in close contact with the NFC reader 400, a payment request event occurs (S1001).

Information corresponding to the payment request is encrypted through the security module 22 and is sent to a connected second terminal 100A (S1002). Then, the second terminal 100A decrypts the encrypted information and then sends a request for deducting the NFC payment amount to the electronic wallet module 35 and the payment server 500 through the payment application 33 running in the background (S1003).

If the NFC payment amount is deducted (S1004), the deducted balance information is encrypted through the security module 32 and is sent to the wearable device 200 (S1005). The wearable device 200 decrypts the received information and displays a result of processing the payment (S1006). As such, while the NFC payment is conducted, the "linkage" between the wearable device 200 and the second terminal 100A is maintained. Meanwhile, a predetermined time after the payment is complete, the NFC payment function of the wearable device 200 turns back to the deactivated state, and the connection with the second terminal 100A is released or the communication network maintaining the connection is changed to another network.

Figure 11:
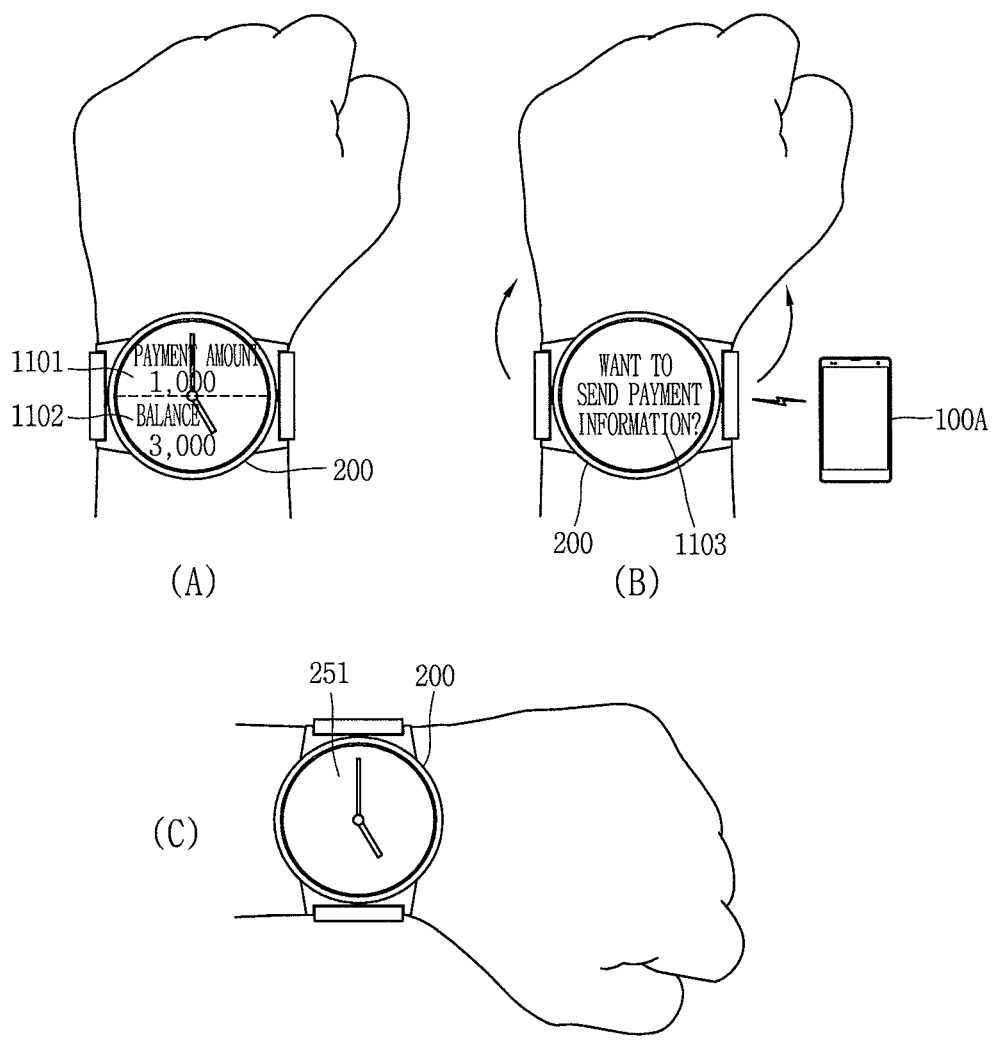
FIG. 11 is a concept view illustrating a method of displaying a result of processing the NFC payment in a wearable device according to an embodiment of the present invention.

FIG. 11 is a concept view illustrating an example method of displaying a result of processing the NFC payment in a wearable device according to an embodiment of the present invention. The controller of the wearable device 200 displays payment amount information on a first region of the touchscreen 251 in response to the NFC payment being complete and newly displays on a second region of the touchscreen 251 the balance information updated based on the balance information previously displayed and the payment amount information displayed on the first region.

For example, as shown in FIG. 11(a), if the NFC payment is complete, the payment amount (e.g. "KRW 1,000") may be displayed on the first region 1101 (e.g., an upper region) of the touchscreen 251 and the updated balance (e.g., "KRW 3,000") may be displayed on the second region 1102 (e.g., a lower region) of the touchscreen 251.

Thereafter, as shown in FIG. 11(b), a message 1103 inquiring about whether to send a result of processing the payment (e.g., a message saying "want to send payment information?") pops up on the touchscreen 251. In this instance, if the user makes the gesture of bending his wrist once or opening his hand, the controller recognizes such gesture as an input of a command for executing transmission, the controller delivers the payment information to the second terminal 100A. This may be distinguished from the processed result of the NFC payment (success/failure of payment) being automatically sent to the second terminal. For example, when the transmission execution command is received by the second terminal 100A, the second terminal 100A may perform control to run an interworking housekeeping book for entry of the NFC payment information.

In addition, if the user makes the gesture of repeatedly twisting his wrist left and right, the controller recognizes such gesture as an input of a command for rejecting transmission and completes the NFC payment without further action. Also In this instance, the NFC payment processed result itself (success/failure of payment) is sent to the second terminal.

A few seconds after the NFC payment is complete, the touchscreen 251 of the wearable device switches to the deactivated state or screen-changes to the existing clock screen as shown in FIG. 11(c). The "linkage" between the watch-type terminal 200 and the second terminal 100A may be released or a change to other communication network may be made (e.g., a switch from Wi-Fi/Bluetooth (BT) communication to the low-power wireless communication (BLE) may occur.

Further, when the amount to be paid is larger than the amount included in the received balance information or the amount included in the received balance information is larger than the amount to be paid but does not reach a preset reference level, the wearable device 200 according to an embodiment of the present invention may output guide information to guide money charging on the touchscreen 251.

Figure 12:
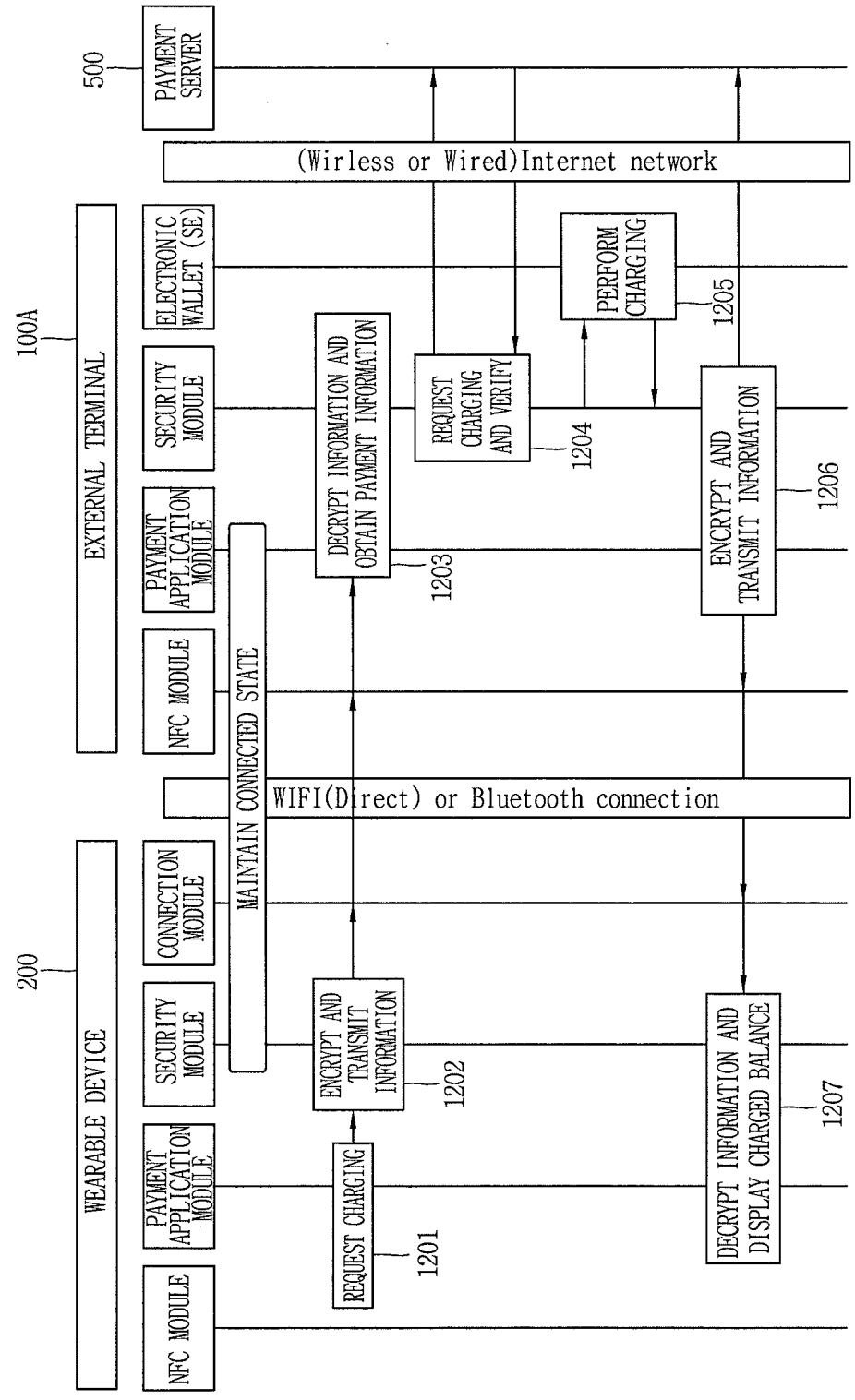
FIGS. 12 and 13 illustrate a method of charging money in a second terminal linked with a wearable device according to an embodiment of the present invention.
Figure 13:
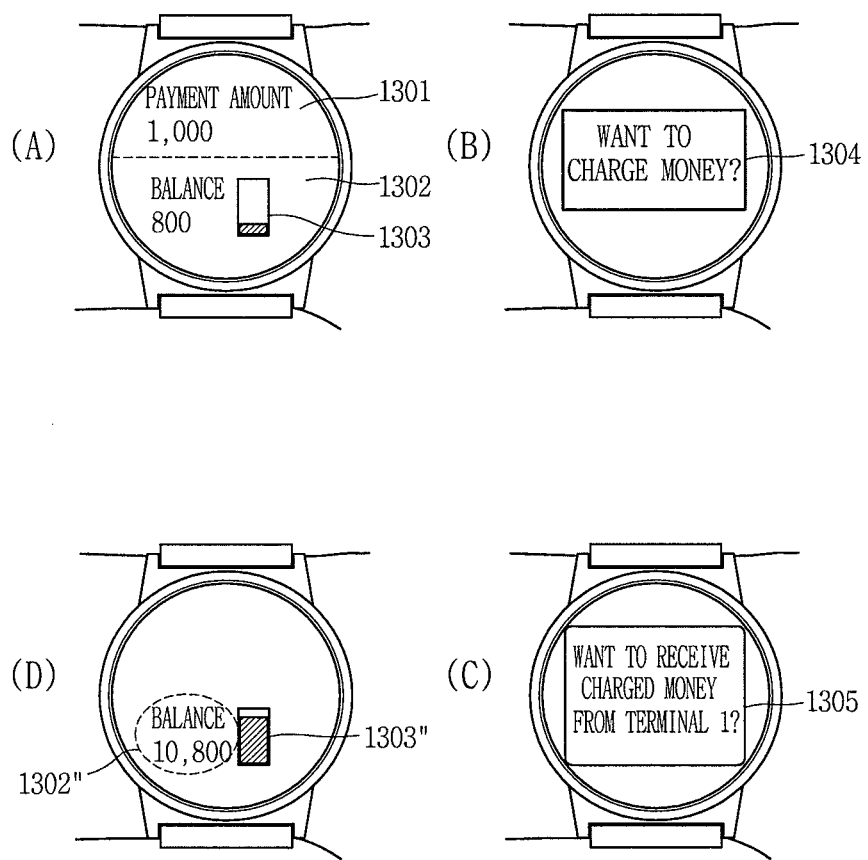

Regarding this, FIGS. 12 and 13 illustrate a method of charging money in a second terminal linked with a wearable device according to an embodiment of the present invention. The controller of the wearable device may compare the level of the balance information displayed on the touchscreen 251 with the reference level, and when a result of the comparison shows that the amount included in the balance information is not more than the reference level, may output on a region of the touchscreen 251 guide information to guide charging money to the electronic wallet (SE).

Here, the reference level may be a predetermined default value (e.g., KRW 1,000) or a minimum amount or an amount in a minimum range which is set through the user's input. Further, the guide information may include a series of charging process for charging the balance in the account of the electronic wallet (SE) equipped in the second terminal 100A in a device selected by the user (the wearable device or second terminal), and if the first step is performed in the charging process, the controller can determine the time for providing information in such a manner as sequentially outputs the next guide information on the touchscreen 251. Further, the money charging is performed in the second terminal 100A, but the guide information therefor may also be output on the wearable device.

While the charging process proceeds, the linkage between the wearable device 200 and the second terminal 100A is maintained. Further, the guide information is output through the touchscreen 251 of the wearable device 200, for example. However, the present invention is not limited thereto. For example, the guide information may be output in the form of any one or a combination of voice guidance, a vibration, a screen change on the displaying unit, and an LED effect.

Also, the time for determining whether to charge the balance may correspond to the time when the balance information received from the linked second terminal 100A is displayed on the touchscreen 251 or the time when next payment information after the NFC payment is performed is displayed on the touchscreen 251. The controller can set up different reference levels for determining whether to charge the balance with respect to the payment amount displayed on the touchscreen 251.

For example, after the NFC payment is conducted, the payment amount displayed on the touchscreen 251 is KRW 1,200, and the balance information resulting from deduction of the payment amount is KRW 1,100, whether to charge the remaining balance (e.g., KRW 1,100) information may be determined based on the payment amount (KRW 1,200) rather than the amount (e.g., KRW 1,000) corresponding to a preset reference level.

Subsequently, referring to FIG. 12, a request for charging the balance is made through the payment application module that is run in the background of the wearable device 200

(S1201). The request for balance charging may be made through a response (e.g., a key input) to the guide information guiding the balance charging as output on the touchscreen 251 as described above. The security module of the wearable device 200 encrypts the balance charging request and sends it to the linked second terminal 100A (S1202).

The second terminal 100A then decrypts the encrypted information and obtains the payment information corresponding to the balance charging request (S1203). Here, the payment information corresponding to the balance charging request means a payment amount for determining whether the level of the received balance information is not more than the above-described reference level. For example, it may be the case that the account included in the balance information before the NFC payment is smaller than the amount to be paid or that the account included in the balance information after the NFC payment is performed is smaller than the payment amount.

Then, the second terminal 100A sends a charging request to the payment server 500 through the payment application module executed in the background and identifies the account of the electronic wallet (SE) (S1204). As much amount as the user entered through the electronic wallet (SE) account or a preset amount of money are charged (S1205). If the money charging to the electronic wallet (SE) account is complete, the information is encrypted and is sent to the wearable device 200 (S1206). The wearable device 200 decrypts the received information and displays the information on the charged balance on the screen (S1207).

Such charging process may be conducted through the wearable device 200 (even in such case, however, the actual balance charging is performed as per the above-described process). In such case, the guide information guiding the charging process may be sequentially output on the touchscreen 251.

As shown in FIG. 13(a), if the NFC payment is performed, the payment amount information is displayed on a first region 1301 (e.g., an upper region) of the touchscreen 251, and the balance information resulting from the deduction of the payment amount is displayed on a second region 1302 of the touchscreen 251. In this instance, an image 1303 (e.g., a battery image) indicating the level of the updated balance information may be displayed as well. When the account included in the updated balance information is smaller than the payment amount, the wearable device 200 can recognize it as occurrence of a money charging request event.

As a result, guide information 1304 guiding the balance charging, such as a message saying "want to charge money?" pops up on the touchscreen 251 as shown in FIG. 13(b). The user performs a preset response gesture (or, a voice input, a key input, etc.) to allow an amount charging request to be sent to the linked second terminal 100A. For example, when the user makes the gesture of closing and opening his hand while wearing the watch-type terminal 200, it may be recognized as input of a control command for transmitting a balance charging request to the second terminal 100A.

Thereafter, upon completion of the charging process described in connection with FIG. 12, a message 1305 guiding the transmission of information, such as a message saying "want to receive the amount charged in terminal 1?" is output on the touchscreen 251 as shown in FIG. 13(c). If the user makes a preset response gesture (or, a voice input, a key input, etc.), the information on the charged balance of the second terminal 100A is received, and as shown in FIG. 13(d), the updated balance information 1302" is displayed on a region of the touchscreen 251. In addition, an image 1303" which is changed as much as the level of the updated balance information is further displayed.

Even though the displayed message 1305 shown in FIG. 13(c) contains the visual information inquiring about whether to transmit the charged "amount," the "information on the amount" charged is actually transmitted rather than the charged amount. During the NFC payment, the wearable device 200 should remain powered-on, at least. To that end, according to an embodiment of the present invention, when the wearable device 200 is short of the battery (a low battery state), another operation mode than the function associated with the NFC payment may be restricted.

Figure 14:
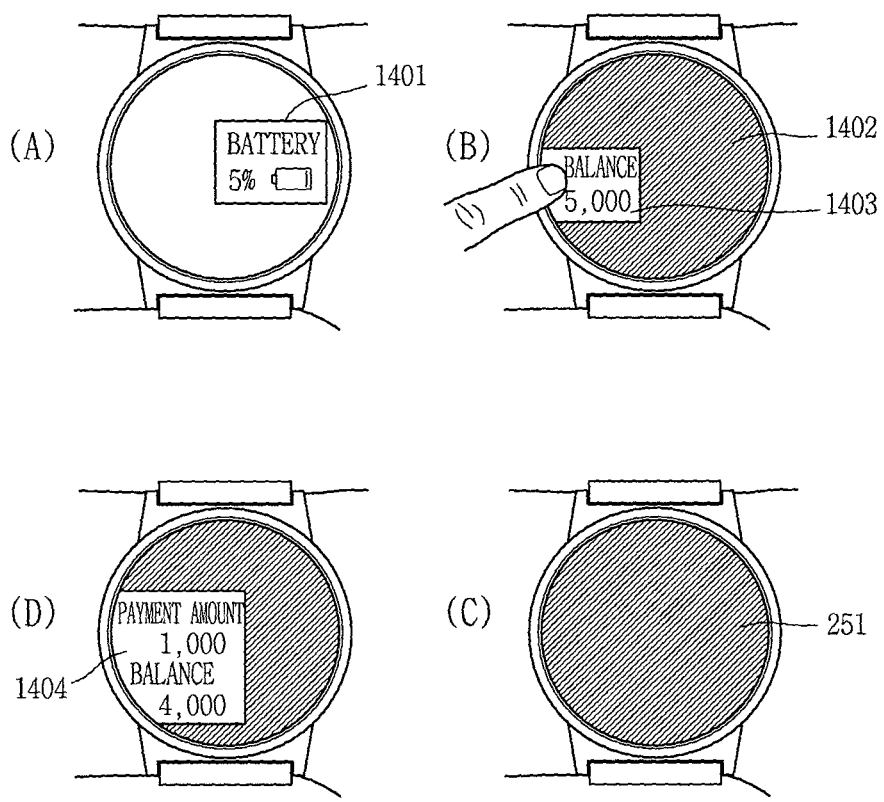
FIG. 14 is a concept view illustrating a method of displaying a result of processing the NFC payment when the wearable device is short of battery according to an embodiment of the present invention.

Regarding this, FIG. 14 is a concept view illustrating a method of displaying a result of processing the NFC payment when the wearable device is short of battery according to an embodiment of the present invention. The controller of the wearable device 200 can check the state of the battery upon NFC payment or while the payment is performed. Also, the state of the battery is associated with the remaining power of the battery, and the controller can check whether the level of the battery is not more than a reference level (for example, reference level: when the remaining battery power is not more than 5%). The reference level may vary depending on the user's selection, and the reference level may be a preset default value before it is changed by the user.

Further, the battery level which is not more than the reference level may be defined as low battery state. The low battery state means the state in which the remaining battery power is insufficient to turn on all of the functions of the terminal to perform general functions of the terminal and is enough to enable the terminal to run on a light operating system for particular functions only. Typically, when the battery voltage is not less than 2.7V, the NFC payment may be performed, and even in the low battery state, NFC payment may be made 20 to 30 times.

When the battery level is not more than the reference level, i.e., in the low battery state, the controller of the wearable device 200 can activate a region of the displaying unit 251 to display the balance information received from the second terminal 100A. The controller can switch the remaining region other than the activated region to the deactivated state.

For example, referring to FIG. 14, if the battery level of the wearable device 200 is not more than the reference level, i.e., the low battery state, visual information 1401 to allow the user to identify such low battery state is output on the touchscreen 251. Then, the controller can restrict the other operation mode than the function associated with the NFC payment. For example, the controller can switch the touchscreen 251 to the deactivated state. Further, the controller can output an image to encourage the user to do battery charging on the wearable device.

In such situation, if the balance information is received from the linked second terminal 100A, only a region 1403 of the touchscreen 251 is activated to display the received balance information (e.g., "KRW 5,000") while the other region 1404 of the touchscreen 251 remains deactivated. Meanwhile, while the NFC payment is performed, the balance information that have been displayed may stop being displayed according to the battery state as shown in FIG. 14(c). If the NFC payment is complete, only the region 1404 of the touchscreen 251 is activated back to display the payment amount and balance.

Examples of performing the NFC payment function using the amount charged to the second terminal linked with the wearable device although the wearable device does not contain any information associated with the payment method have been described above. Hereinafter, embodiments in which the wearable device shares the amount of money with other pre-registered second terminal(s) when the wearable device also contains information relating to the payment means, i.e., when the electronic wallet (SE) is equipped in the wearable device are described in detail.

Figure 15:
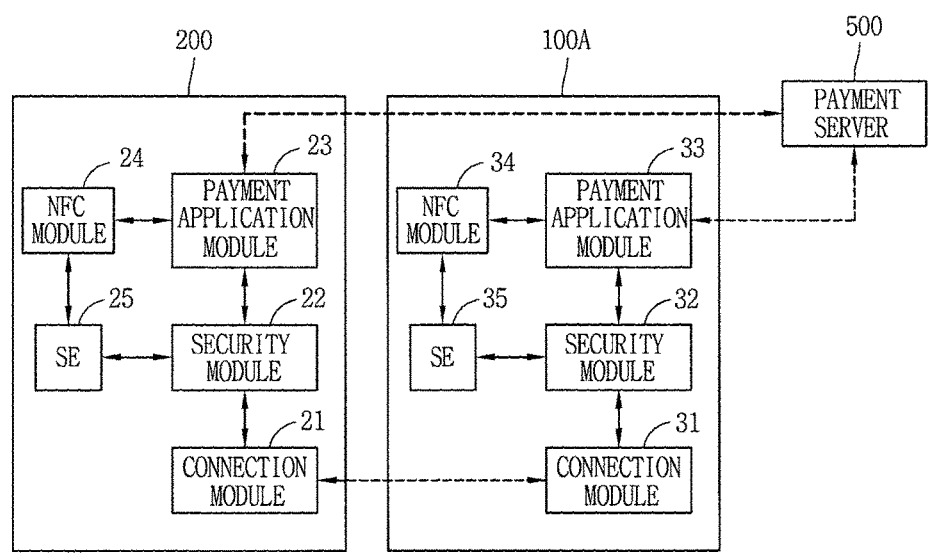
FIG. 15 is a view illustrating an example in which a wearable device equipped with a first electronic wallet is linked with a second terminal equipped with a second electronic wallet according to an embodiment of the present invention.

FIG. 15 is a view illustrating an example in which a wearable device equipped with a first electronic wallet is linked with a second terminal equipped with a second electronic wallet according to an embodiment of the present invention. Also, it is assumed that the account of the first electronic wallet differs from the account of the second electronic wallet.

In other words, it is assumed that the account of the first electronic wallet equipped in the wearable device 200 and the account of the second electronic wallet equipped in the second terminal 100A, rather than mapped and registered with the same payment account, adopt payment accounts respectively corresponding to different virtual accounts, actual accounts, prepaid cards, and deferred payment cards. This generally means that each of the account of the first electronic wallet and the account of the second electronic wallet should be charged.

As shown in FIG. 15, the wearable device 200 includes a connection module (connection manager) 21, a security module (security agent) 22, a payment application module (payment App.) 23, an NFC module 24, and a first electronic wallet (SE) 25. The connection module (connection manager) 21 is a component for performing linkage with the pre-registered second terminal 100A. Further, the security module (security agent) 22 is a component for safe data communication between the wearable device 200 and the second terminal 100A linked with each other. In addition, the payment application module (payment App.) 23 is an application that runs in the background of the main body for linkage with the second terminal 100A in the wearable device 200 and is activated through a predetermined input (a first input to be described below in greater detail).

The NFC module 24 is a component for tagging the NFC reader in order to perform NFC payment. The NFC module 24 receives an NFC signal (i.e., a payment request signal) as it comes in close contact with the NFC reader, and in response thereto, sends corresponding payment information. The first electronic wallet (SE) 25 means a payment method (e.g., an IC card, a USIM (Universal Subscriber Identity Module), a micro SD, a sticker, an embedded SE, etc.) that may perform the payment function through communication with the payment server 500.

Further, the balance information of the electronic wallet to be described below may include points or amount of money previously charged to, e.g., a prepaid card, as well as an amount of money or points charged to at least one of a virtual account, an actual account, a prepaid card, and a mobile phone payment account as issued from a financial organization.

Also, when Wi-Fi communication is available, the wearable device 200 can gain direct access to the payment server 500 through the payment application module (payment App.) 23 in order to perform the payment function. In contrast, when only Bluetooth (BT) communication is available, the wearable device 200 can access the payment server 500 through the second terminal 100A in order to perform the payment function.

Further, as shown in FIG. 15, the second terminal 100A linked with the wearable device 200 can include a connection module (connection manager) 31, a security module (security agent) 32, a payment application module (payment App.) 33, an NFC module 34, and a second electronic wallet (SE) 35. The second terminal 100A may maintain the linkage with the wearable device 200 until the NFC payment is complete. By the same, when the wearable device 200 performs the NFC payment using the first electronic wallet (SE) 25, the wearable device 200 can access the payment server 500 via the second terminal 100A.

The wearable device 200 can perform the NFC payment using the balance of the first electronic wallet (SE) 25 or the second electronic wallet (SE) 35 or perform the NFC payment using the sum of the balance of the first electronic wallet (SE) 25 and the balance of the second electronic wallet (SE) 35. Here, it is assumed that the first electronic wallet (SE) 25 and the second electronic wallet (SE) 35 use their respective independent accounts.

When only the second electronic wallet (SE) 35 is used, the second terminal 100A receives payment information and information on the franchise to which the wearable device 200 has been tagged and sends payment amount information corresponding to the payment information to the wearable device 200. In this instance, unlike described in connection with FIG. 4, the amount charged to the second electronic wallet (SE) 35, itself, may be transmitted from the second terminal 100A to the first electronic wallet (SE) 25 of the wearable device 200. The user can immediately check the information on the balance charged to the second electronic wallet (SE) 35 through the wearable device 200 and perform payment using the checked balance. In other words, a predetermined amount of money is withdrawn from the second electronic wallet to make payment.

When both the first electronic wallet (SE) 25 and the second electronic wallet (SE) 35 are used, the wearable device 200 and the second terminal 100A share the amounts of money corresponding to their respective electronic wallets. A predetermined amount of money withdrawn from the first electronic wallet (SE) 25 may be charged to the account of the second electronic wallet (SE) 35 or a predetermined amount of money may be charged to the account of the first electronic wallet (SE) 25 through a predetermined input. In other words, it is similar to transfer from one account to another account.

However, as will be described below, according to an embodiment of the present invention, a number of steps need not be performed like the existing money transfer function, and rather, the money transfer between the wearable device 200 and the second terminal 100A may be quickly performed through the user's intuitive gesture.

If the NFC payment function is executed, the respective payment applications of the wearable device 200 and the second terminal 100A are run in the background. The wearable device 200 and the second terminal 100A are connected with the payment server 500 via their respective payment applications. Meanwhile, as described above, when the wearable device 200 cannot perform Wi-Fi communication, the wearable device 200 can communicate with the payment server 500 via the connection module (connection manager) 21 and the connected second terminal 100A to perform the payment function.

Figure 16:
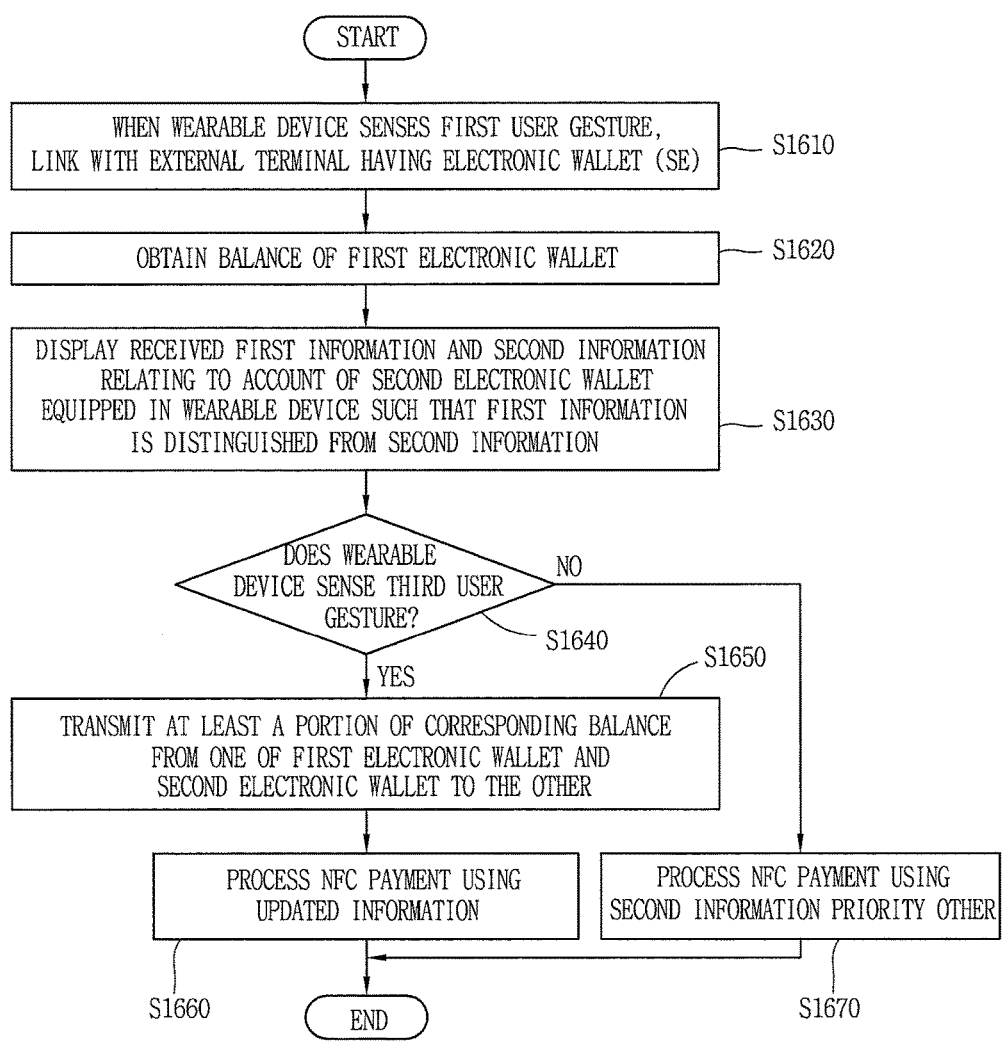
FIG. 16 is an example flowchart illustrating a method of operating a wearable device equipped with an electronic wallet according to an embodiment of the present invention.

FIG. 16 is an example flowchart illustrating a method of operating a wearable device equipped with an electronic wallet according to an embodiment of the present invention. Hereinafter, it is assumed that the wearable device 200 includes a predetermined compartment unit 175 to equip an electronic wallet (SE).

Referring to FIG. 16, application of a first input may be first sensed with an electronic wallet (SE, Secure Element)- equipped wearable device, e.g., a watch-type terminal, placed on a particular portion of the user's body (e.g., the user's wrist). If the first input is sensed, the controller can access at least one second terminal equipped with an electronic wallet (SE, Secure Element) (S1610).

Here, the first input may be sensed through a combination of one or more of an acceleration sensor, a magnetic sensor, a G-sensor, a gyroscope sensor, and a motion sensor to sense the gesture of the user wearing the main body 201 on at least a portion of the main body 201 or the band 202. For example, the first user gesture may be the gesture of rotating the touchscreen provided in the wearable device in the direction away from the user's body while the user stretches his arm wearing the wearable device. However, the present invention is not limited to the gesture, and the gesture may be set or changed to a certain motion desired by the user. As another example, the first user gesture may be at least one of a preset voice command and a preset type of touch input.

Also, as used herein, the electronic wallet (SE, Secure Element) means at least one payment method (e.g., an IC card, a USIM (Universal Subscriber Identity Module), a micro SD, a sticker, an embedded SE, etc.) that can access an external server through a payment application to perform the payment function, as described above. Further, the information relating to the account of the electronic wallet, as will be described below, includes all of the points or an amount of money previously charged to a prepaid card, as well as user information, charged balance, and transaction history or other information of the account registered to at least one of a virtual account, an actual account, a prepaid card, and a mobile phone payment account as issued from a financial organization.

If the first input is sensed, the controller of the wearable device recognizes the sensed first input as a control command for linkage with the pre-registered second terminal. Specifically, the wearable device "linkage" with the second terminal means a connected state in which the wearable device 200 is connected with the second terminal to access the account of the electronic wallet (SE, Secure Element) equipped in the second terminal.

In other words, a typical connection for data or information communication between the wearable device and the second terminal is referred to as "pairing," which may be distinguished from the above-described "linkage." For example, even when the wearable device and the second terminal are already in the state of pairing, when the above-described preset user gesture is sensed, it may be referred to as the wearable device 200 "linkage" with the second terminal, and in such case, the electronic wallet (SE, Secure Element) equipped in the second terminal may be accessed.

Meanwhile, in order to allow the user to be aware of which one of the pairing for typical data communication and the linkage for accessing the electronic wallet (SE, Secure Element) the connection between the wearable device and the second terminal is, different types of feedback may be output corresponding to the pairing and the linkage, respectively. The above-described "linkage" may also include when the wearable device and the second terminal switch their communication state from the low-power wireless communication (BLE, Bluetooth Low Energy) communication for maintaining only the connected state to Bluetooth (BT) or Wi-Fi communication for accessing the account of the electronic wallet (SE, Secure Element) equipped in the second terminal as a preset user gesture is sensed.

Meanwhile, because the wearable device according to an embodiment of the present invention performs the NFC payment while placed on a particular portion of the user's body, the wearable device may periodically receive the user's biometric information to previously verify the user's identity. As used herein, the biometric signal means an electrical signal that is generated from the body of the user wearing the wearable device 200. For example, the biometric signal may be any one of an ECG (ElectroCardioGram) signal, a PPG (Photoplethymogram) signal, or a GSR (Galvanic Skin Response) signal, but not limited thereto. Rather, various types of signals widely adopted in the art may be all included. Further, the wearable device 200 can include a plurality of sensors, such as, e.g., an ECG sensor, a PPG sensor, a body temperature sensor, a hear rate sensor, and a pressure sensor.

If a user's identity is verified based on the user's biometric signal, authentication is automatically performed without a separate authentication process for access to the second terminal, NFC payment, and money transfer to the connected second terminal, and money charging. Accordingly, finance-related functions have enforced security. In other words, the user can allow his identity to be verified by simply wearing the wearable device 200, and even upon linkage with the second terminal or upon execution of a function requiring security such as finance-related functions, no separate authentication step needs to be performed.

Meanwhile, the first input to request the linkage with the second terminal, as described above in connection with FIGS. 6(a) and (b), may be the gesture of the user stretching his arm with his wrist wearing the wearable device 200 rotated in the direction away from the user's body, the gesture of rotating his wrist in the direction away from his body with his arm stretched, or both thereof. This is similar to the gesture for the user to bring the payment method in close contact with the NFC reader, and it allows for smooth pairing with the second terminal by an intuitive gesture corresponding to the access request for NFC payment.

In addition, the user's intuitive gesture may be varied by the user's input, and as another example, the gesture may be implemented as a voice command, a touch input, or a close contact, as described above. The controller can also distinguish a linkage request corresponding to the first input (i.e., a connection request for NFC payment) from a connection request for performing other functions (e.g., exchange content with the second terminal). Specifically, the wearable device 200 and the second terminal 100A may run the payment applications in the background in response to the connection request corresponding to the first input and may be wirelessly connected with the payment server 500.

Further, the controller can output a feedback corresponding to the connection request corresponding to the first input. In this instance, the feedback may be a combination of at least one of a preset pattern of vibration, a sound, a message, a screen change on the touchscreen, and a change in the LED. For example, different types of feedback may be output for when the connection request corresponding to the first input succeeds and when the connection request corresponding to the first input fails (for example, when the connection succeeds, a first vibration (a long-lasting vibration) may be output, and when the connection fails, a second vibration (a short-lasting vibration) may be output.)

If the second input is sensed by the wearable device with the wearable device linked with the second terminal (S1620), the balance information of the account of the first electronic wallet (SE) equipped in the second terminal 100A is received. As used herein, the second input refers to an input continuously applied with a variation in operation corresponding to the first input made to the wearable device.

Specifically, the second input may be a user input applied to the main body while the wearable device is placed on the user's body, and the second input may be at least one of a preset user gesture, a voice command, and a preset type of touch input, which is different from the above-described first input.

If the second input is sensed, the controller can recognize it as input of a control command for verifying the information on the balance charged to the linked second terminal and information on the balance charged to the wearable device. When the second input for verifying the information on the balance charged to the second terminal (hereinafter, referred to as "balance of the first electronic wallet account") and the information on the balance charged to the wearable device (hereinafter, referred to as "balance of the second electronic wallet account") is a preset user gesture, this may be a user gesture of rotating his wrist back to the inside of his body to allow the touchscreen 251 to be oriented towards the user with the control operation corresponding to the first input (connection with the second terminal) executed.

Because this is similar to the user gesture for checking the touchscreen 251, the user can naturally check the balances remaining in the accounts of the plurality of electronic wallets through a mere intuitive gesture. Meanwhile, such user's intuitive gesture may be varied through the user's input, and in another embodiment, may be implemented as a voice command, a touch input, or a close contact. As a result, the balance of the first electronic wallet account received from the second terminal 100A and the balance of the account of the second electronic wallet (SE) equipped in the wearable device are displayed on the touchscreen 251 so they may be distinguished from each other (S1630).

Specifically, the balance of the first electronic wallet account may be displayed on a first region of the touchscreen 251, and the balance of the second electronic wallet account may be displayed on a second region of the touchscreen 251 such that they are visually distinguished from each other. The visually distinguished display means an "highlighting effect" by which any one of the balance of the first electronic wallet account and the balance of the second electronic wallet account is shown to be different from the other by at least one of magnifying, shrinking, color changing, flickering, and transparence changing. Further, the balances displayed on their respective regions may be displayed together with the images indicating their respective corresponding devices (e.g., a thumbnail image of the watch-type terminal and a thumbnail image of the second terminal).

Further, the wearable device 200 can sense application of a third input while the first information relating to the first electronic wallet account and the second information relating to the second electronic wallet account are displayed on the touchscreen 251 (S1640). Here, the third input is the user's input that is applied to the main body with the wearable device placed on the user's body, and the third input may be, for example, at least one of a preset user gesture, a voice command, and a preset type of touch input which are different from the above-described first input and the second input.

If such third input is sensed, the controller can recognize it as input of a control command to transmit a predetermined amount of money to the linked second terminal 100A or to receive a predetermined amount of money from the linked second terminal 100A. In other words, in response to the wearable device 200 sensing the third input, the controller can send at least a portion of a corresponding balance from any one of the first electronic wallet account and the second electronic wallet account to the other.

The controller can determine a device (e.g., the wearable device) to which at least a portion of the balance is to be sent and the amount to be sent (e.g., 50% of the balance) based on the third input. Depending on the type of the third input (e.g., a touch input, a gesture, or a voice command), different schemes may apply to determine the device to which the balance is sent or the amount to be sent based on the third input, which will be described below in greater detail with reference to FIGS. 17A, 17B, and 17C.

Then, if the balance information of the first electronic wallet account and the second electronic wallet account is updated according to the third input, the wearable device performs the NFC payment function using the balance information (S1660). Specifically, if the wearable device 200 is brought in close contact with the NFC reader 400 (FIG. 3) with the balance information displayed on the touchscreen 251, the franchise information and payment information are received and are transmitted to the linked second terminal 100A.

To that end, the NFC module of the wearable device 200 should be previously activated before coming close to the NFC reader 400. According to an embodiment of the present invention, when the first or second input is sensed by the wearable device as described above, the NFC module may be automatically activated. Further, deduction of the payment amount may be made from one of the balance of the first electronic wallet account and the balance of the second electronic wallet account earlier than from the other balance or may be made from the balance of the electronic wallet account corresponding to a preset priority (e.g., assigning the higher priority to the device to which close contact is brought for NFC payment).

If the NFC payment is complete, the controller can output a feedback (e.g., a sound, vibration, message, screen changing, LED effect, etc.) corresponding to a result of processing the NFC payment. For example, when the NFC payment is successfully performed, the payment information and updated balance information, along with the first vibration (e.g., a long-lasting vibration), may be displayed on the touchscreen 251. In contrast, when the NFC payment fails, a message indicating the cause of the failure, together with the second vibration (e.g., a short-lasting vibration), may be output on the touchscreen 251.

Meanwhile, if the NFC payment is performed while the third input is not applied in step S1640, the NFC payment is first conducted for the amount corresponding to the second electronic wallet account among the information items displayed on the touchscreen 251 (S1670). In other words, the NFC payment is first performed using only the electronic wallet (SE) equipped in the wearable device 200. In this instance, unless it is possible to make the payment only with the amount corresponding to the second electronic wallet account, the amount corresponding to the first electronic wallet account may be deducted as much as the insufficient amount, thereby to process the NFC payment. Or, similar to what is described above, guide information to guide charging the second electronic wallet account may be output.

If the NFC payment is complete, the payment information is displayed on a region of the touchscreen 251, and updated balance information of the second electronic wallet account updated based on the balance amount information is displayed on another region of the touchscreen 251. Further, a result of processing the NFC payment is notified to the second terminal 100A. In order to reduce power consumption of the wearable device 200, the linkage between the wearable device 200 and the second terminal 100A may be switched to the released state or communication state may be varied differently (e.g., switch from BT/Wi-Fi to low power wireless communication (BLE)).

Figure 17A:
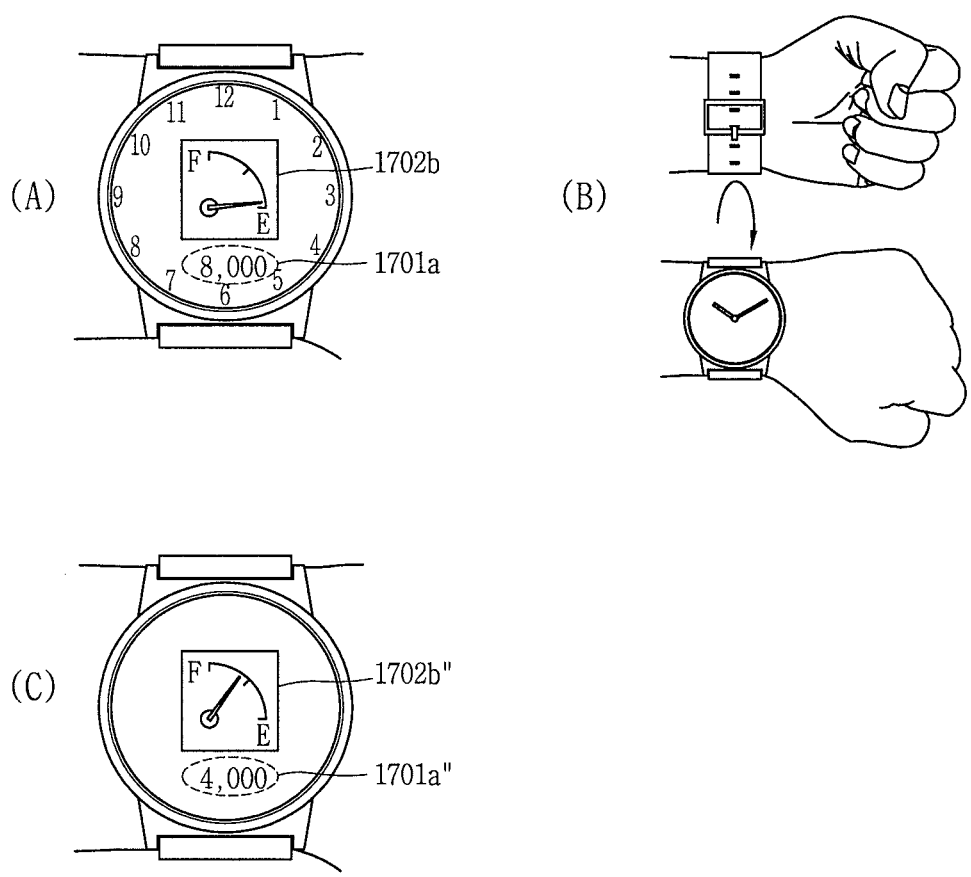
FIGS. 17A, 17B, and 17C are concept views illustrating a method of sharing amounts of money charged between a linked second terminal and a wearable device according to an embodiment of the present invention.
Figure 17B:
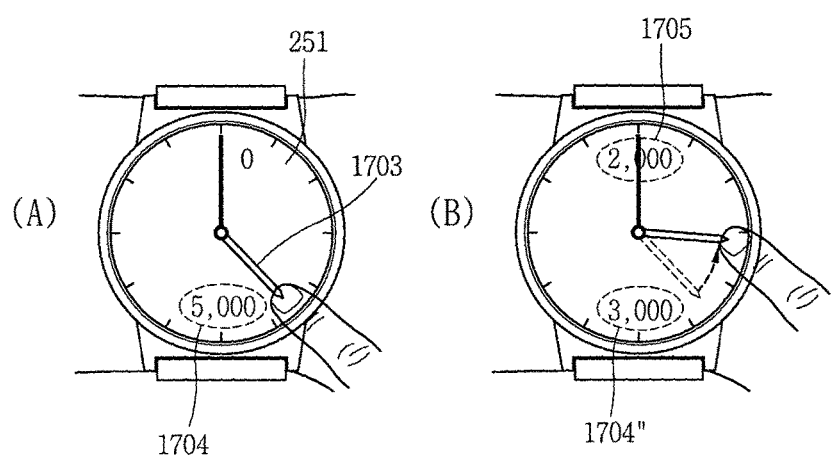
Figure 17C:
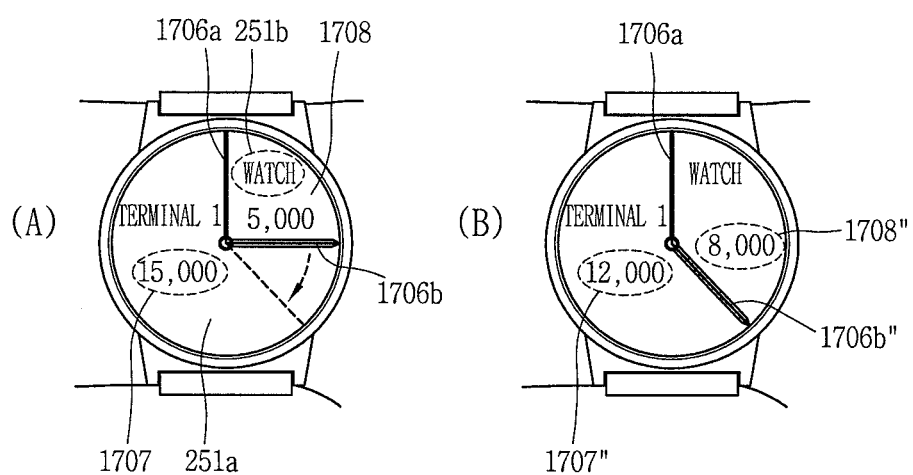

FIGS. 17A, 17B, and 17C illustrate various examples for sharing the amount charged to the wearable device and the amount charged to the second terminal according to an embodiment of the present invention. If the wearable device 200 is linked with the pre-registered second terminal 100A, the balance information of the account of the electronic wallet (SE) equipped in the wearable device 200 and the balance information of the account of the electronic wallet (SE) equipped in the second terminal 100A are displayed on the touchscreen 251.

In such circumstance, if the third input is sensed, the wearable device 200 can switch from NFC payment mode to money transfer mode. Here, the money transfer mode means a state in which a predetermined amount of money may be transmitted (or received) between the wearable device 200 and the second terminal 100A which are linked with each other for NFC payment function. Accordingly, the money transfer to other terminal or other account is hereinafter limited, for the purpose of description.

If the wearable device 200 switches to the amount transfer mode, the controller of the wearable device 200 can transfer at least a portion of a corresponding balance from any one of the first account corresponding to the first electronic wallet equipped in the main body and the second account corresponding to the second electronic wallet equipped in the second terminal 100A to the other account.

As an example, if a user gesture corresponding to the third input is applied, the controller can determine the account (or device) to which the balance is sent or the degree of the balance (or amount) to be sent, based on the direction or degree of the slope of the main body as sensed through the sensing unit.

FIG. 17A shows an embodiment in which at least a portion of the charged amount is sent from the wearable device 200 to the second terminal 100A through a preset gesture. As shown in FIG. 17A(a), if the amount transfer mode is executed, the information 1701a on the balance (e.g., "KRW 8,000") charged to the wearable device 200 and an image 1702b (e.g., a gas pump image on the dashboard of a vehicle) to visually show the degree of charging may be displayed on the touchscreen 251.

In such state, upon sensing the gesture of orienting the user's wrist wearing the watch-type terminal 200 to the ground (i.e., the gesture of filling water in a bucket) while twisting the user's wrist wearing the watch-type terminal 200 in a direction (e.g., in left and right directions or clockwise/counterclockwise) as shown in FIG. 17A(b), at least a portion of the charged balance is transferred to the electronic wallet account of the linked second terminal 100A.

In this instance, the controller of the wearable device 200 can determine the amount to be sent in proportion of the degree of twisting the wrist and the inclination speed. For example, if the inclination of the wrist or inclination speed is increased, a large amount of money included in the charged balance information 1701a (e.g., 80% of the charged balance information) may be transferred to the electronic wallet account of the second terminal 100A. Or, the controller of the wearable device 200 can determine the amount to be sent to be in proportion to the degree (or a difference in height) by which the user's wrist moves down to the ground.

Further, according to an embodiment of the present invention, the user's identity may be previously verified based on the received biometric information while the user wears the wearable device 200, thus eliminating the need for separate user authentication for money transfer. In this instance, if the authentication of the user identity based on the received biometric information fails, the money transfer process halts or an alert may be output. As a result of the money transfer, as shown in FIG. 17A(c), the information 1701a on the balance after the transfer (e.g., "KRW 4,000") and an image 1702b indicating that the degree of charging has changed are output on the touchscreen 251.

In addition, if a gesture in an opposite direction of the direction as shown in FIG. 17A(b) (i.e., the gesture of pulling the water out of the bucket) is sensed, at least a portion of the amount charged to the second terminal 100A is sent to the electronic wallet (SE) equipped in the wearable device 200.

FIGS. 17B and 17C illustrate embodiments in which at least a portion of a charged amount of money is transferred from the wearable device 200 to the second terminal 100A (or from the second terminal 100A to the wearable device 200) through a touch input on the touchscreen 251. As shown in FIG. 17B(a), if the money transfer mode is executed, the information 1704 on the balance charged to the wearable device 200 (e.g., "KRW 5,000") and an image object 1703 visually indicating the degree of charging (e.g., a clock hand image indicating a certain time) may be displayed on the touchscreen 251.

In such state, if the user touches and drags the image object 1703 in a direction (e.g., counterclockwise) as shown in FIG. 17B(a), a portion of the charged balance is transferred to the electronic wallet account of the linked second terminal 100A in proportion to the degree of dragging (in contrast, if the user touches and drags the image object in another direction (e.g., clockwise), the balance charged to the second terminal 100A is transferred to the electronic wallet account of the wearable device 200 in proportion to the degree of drag).

As a result, as shown in FIG. 17B(b), the image object 1703 is moved to a point where the touch is terminated and is displayed, and the balance information 1704" obtained by deducting the transferred amount corresponding to the shift of the image object is displayed on a region (e.g., a lower region) of the touchscreen 251. The information 1705 on the amount transferred to the electronic wallet account of the second terminal 100A is displayed on another region (e.g., an upper region) of the touchscreen 251.

According to another embodiment of the present invention, a fingerprint sensor may be implemented to be activated on a region of the touchscreen 251 which displays the image object. Accordingly, while the user makes a touch for shifting the image object, the user's identity may be verified once more through finger scan. In another embodiment, as shown in FIG. 17C(a), if the money transfer mode is executed, the information 1708 on the balance charged to the watch-type terminal 200 (e.g., "KRW 5,000") may be displayed on a first region 251b of the touchscreen 251, and the information on the balance charged to the linked second terminal 100A (e.g., "KRW 15,000") may be displayed on a second region 251a of the touchscreen 251.

In this instance, the sizes of the first region 251b and the second region 251a of the touchscreen 251, as shown, may be defined to be in proportion to the balance information of their respective corresponding electronic wallet accounts. In other words, the second region 251a corresponding to the electronic wallet account of the second terminal 100A having a larger charged balance may be defined to have a larger size.

In such state, the controller can transfer at least a portion of a corresponding balance from any one of the electronic wallet account corresponding to the first region 251*b* and the electronic wallet account corresponding to the second region 251*a* to the other account based on the direction and degree of dragging a touch applied to at least one of lines 1706*a* and 1706*b* defining the first region 251*b* and the second region 251*a* of the touchscreen 251. For example, if the user touches the second line 1706*b* and then drags it to the second region 251*a*, the electronic wallet account of the wearable device is charged in proportion to the degree of drag.

As a result, as shown in FIG. 17C(b), the second line 1706*b* is shifted and displayed to the point where the touch is terminated, and the balance information 1708" (e.g., "KRW 8,000") of the electronic wallet account of the wearable device 200, wherein the balance is charged as much as the shift of the second line, is displayed on the varied first region 251*b* of the touchscreen 251. The balance information obtained after deduction from the electronic wallet account of the second terminal 100A (e.g., "KRW 12,000") is displayed on the varied second region 251*a* of the touchscreen 251.

Further, In addition, at least a portion of the charged amount may be transferred from the wearable device 200 to the second terminal 100A (or from the second terminal 100A to the wearable device 200) through a voice (e.g., to input the amount to be sent by voice) or a handwriting input (e.g., to directly input the amount to be sent on the touchscreen) in the money transfer mode. If the money transfer is complete in then money transfer mode, the controller can output a feedback corresponding to whether the money transfer is done and a result of the transfer.

Further, if the money transfer is complete in the money transfer mode, the controller can switch from the money transfer mode back to the NFC payment function mode. According to the above-described embodiments, the amount charged to the wearable device 200 can be used for NFC payment that is performed in the linked second terminal 100A, and the amount charged to the second terminal 100A may be used for NFC payment that is performed in the linked wearable device 200. In this instance, the user should be able to check the transaction history of the charged amounts based on the device which has performed the NFC payment. Regarding this, FIGS. 18*a* and 18 are example concept views illustrating a method of identifying a result of processing NFC payment through a wearable device according to an embodiment of the present invention.

Figure 18A:
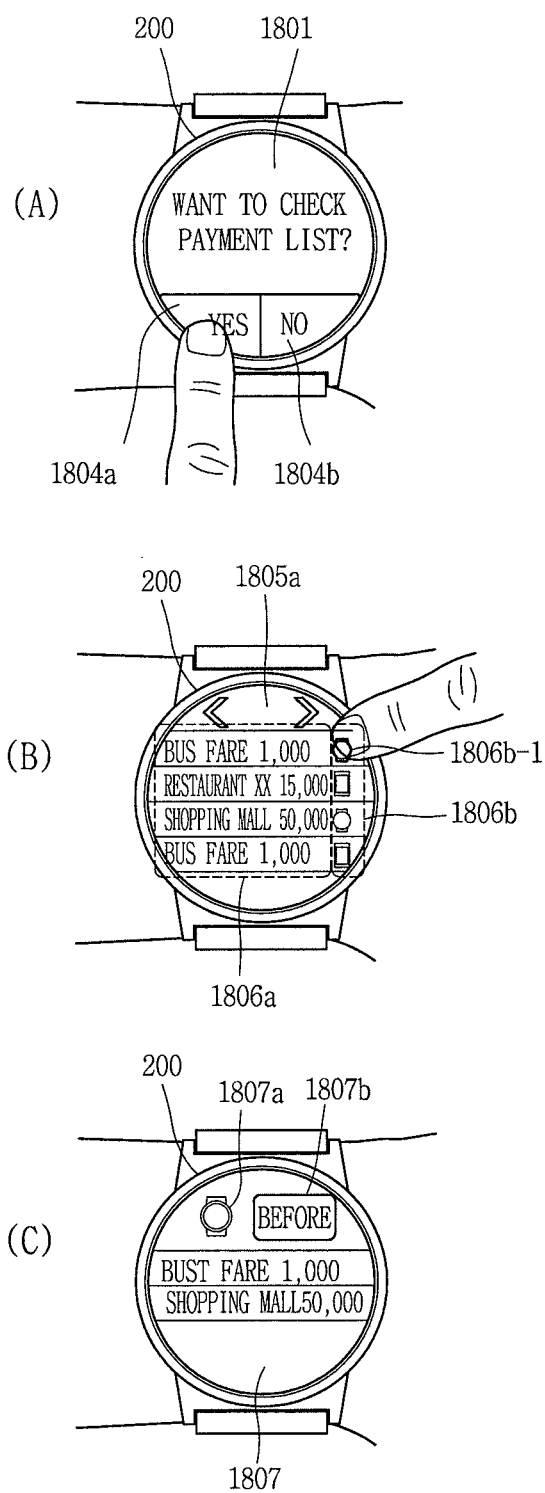
FIGS. 18A and 18B are concept views illustrating a method of displaying a result of processing NFC payment in a wearable device according to an embodiment of the present invention.

First, referring to FIG. 18A(a), if a predetermined input is applied to the wearable device, e.g., the watch-type terminal 200, or NFC payment is complete, a message 1801, e.g., saying "want to check payment list?" pops up on the touchscreen 251. In addition, a key 1804*a* for requesting checking and a key 1804*b* for omitting the checking are displayed.

If the key 1804*a* requesting the checking is touched, a history of transactions in which payment has been made through the wearable device for a preset time (e.g., every week or for a period of time set by the user) is displayed on the touchscreen 251 as shown in FIG. 18*a*(*b*). Here, the transaction history includes the franchise information and the payment amount 1806*a* as shown. Further, the transaction history may further include identification information (e.g., the watch-type terminal or second terminal) 1806*b* corresponding to the electronic wallet from which the payment amount has been deducted.

When there is a large amount of information corresponding to the transaction history, a preset touch input, e.g., an upper/lower flicking touch input, may be applied to the touchscreen 251 to scroll up and down the output transaction history or may use a page turning icon 1805*a* to turn to a previous/subsequent page. Further, if the user applies a preset touch input, e.g., a long touch input, to the identification information of a particular terminal displayed on the touchscreen 251, i.e., the thumbnail image 1806*b*_1 of the watch-type terminal, only the transaction history 1807 in which payment has been made through the electronic wallet (SE) equipped in the watch-type terminal may be displayed on the touchscreen 251 as shown in FIG. 18A(c).

If a region of the touchscreen 251, for example, a "previous" key 1807B displayed on an upper region is touched, the screen changes back to that shown in FIG. 18A(b). Such transaction history may also be transmitted to the second terminal, and may be automatically input to a housekeeping book application interworking with the second terminal.

Figure 18B:
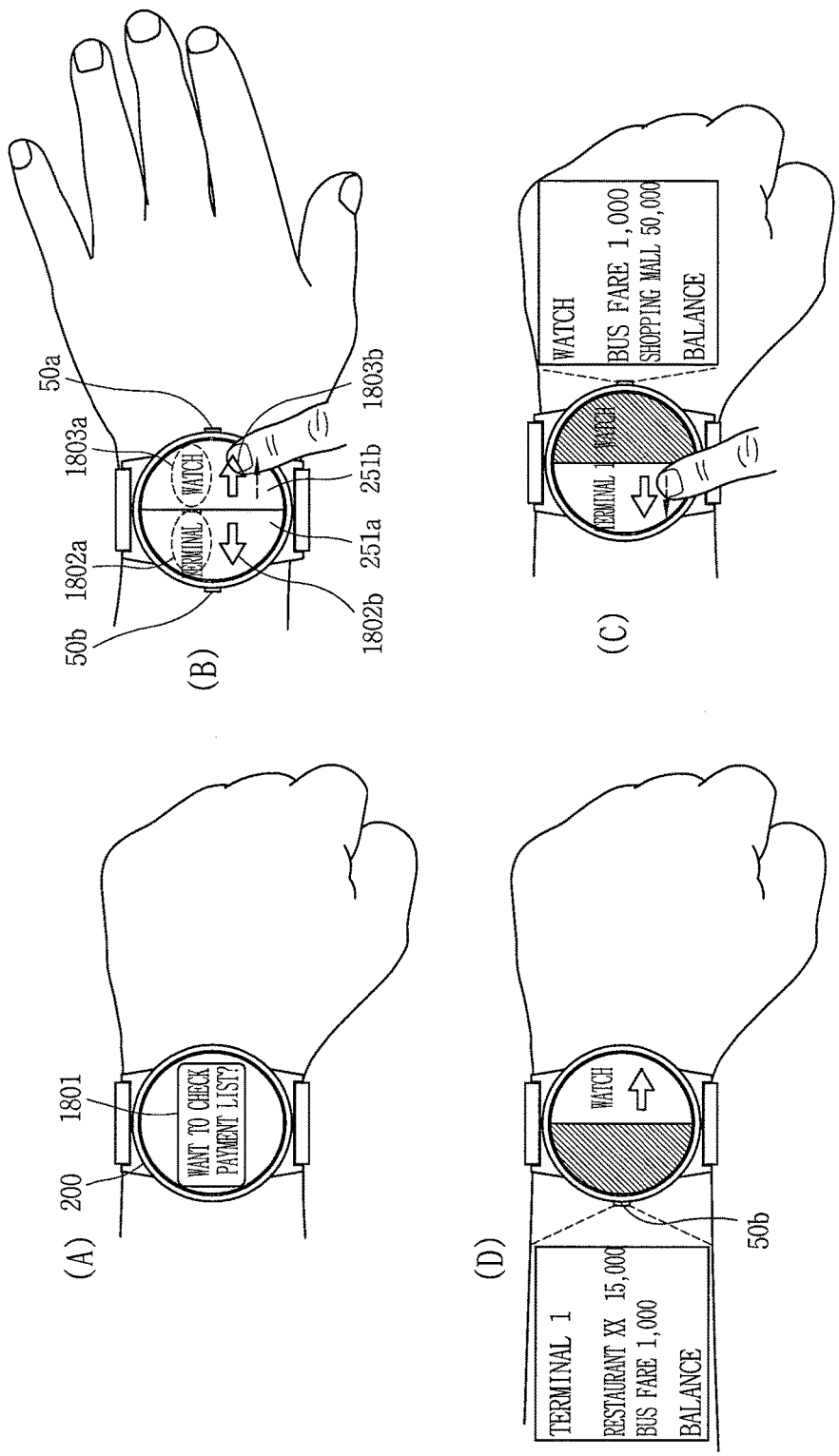

Next, FIG. 18B illustrates another example of displaying a transaction history. As shown in FIG. 18B(a), if a predetermined input is applied to the watch-type terminal 200 or the NFC payment is complete, a message 1801 saying, e.g., "want to check payment list?" pops up on the touchscreen 251.

If the user touches the popped-up message or makes a gesture for acceptance (e.g., the gesture of closing and opening a hand), it enters the transaction history mode. Accordingly, as shown in FIG. 18B(b), a touch region for viewing a transaction history in which payment has been made through the second terminal 100A is displayed on the first region 251*a* of the touchscreen 251, and a touch region for viewing a transaction history in which payment has been made through the wearable device 200 is displayed on the second region 251*b* of the touchscreen 251.

If the user touches any one of the first region 251*a* and the second region 251*b* of the touchscreen 251, a transaction list in which payment has been made through a device corresponding to the touched region is output on the touchscreen 251 (screen change). When there is a large amount of information corresponding to the transaction history, as shown in FIG. 18B(c) and (d), transaction lists in which payment has been made through a device corresponding to the touched region may be projected to the back of the user's hand or arm through a plurality of projection units 50*a* and 50*b* provided in the watch-type terminal 200. Further, such transaction history may be transmitted to the second terminal as well. Further, the transaction history may be automatically input to a housekeeping application interworking with the second terminal.

Figure 19:
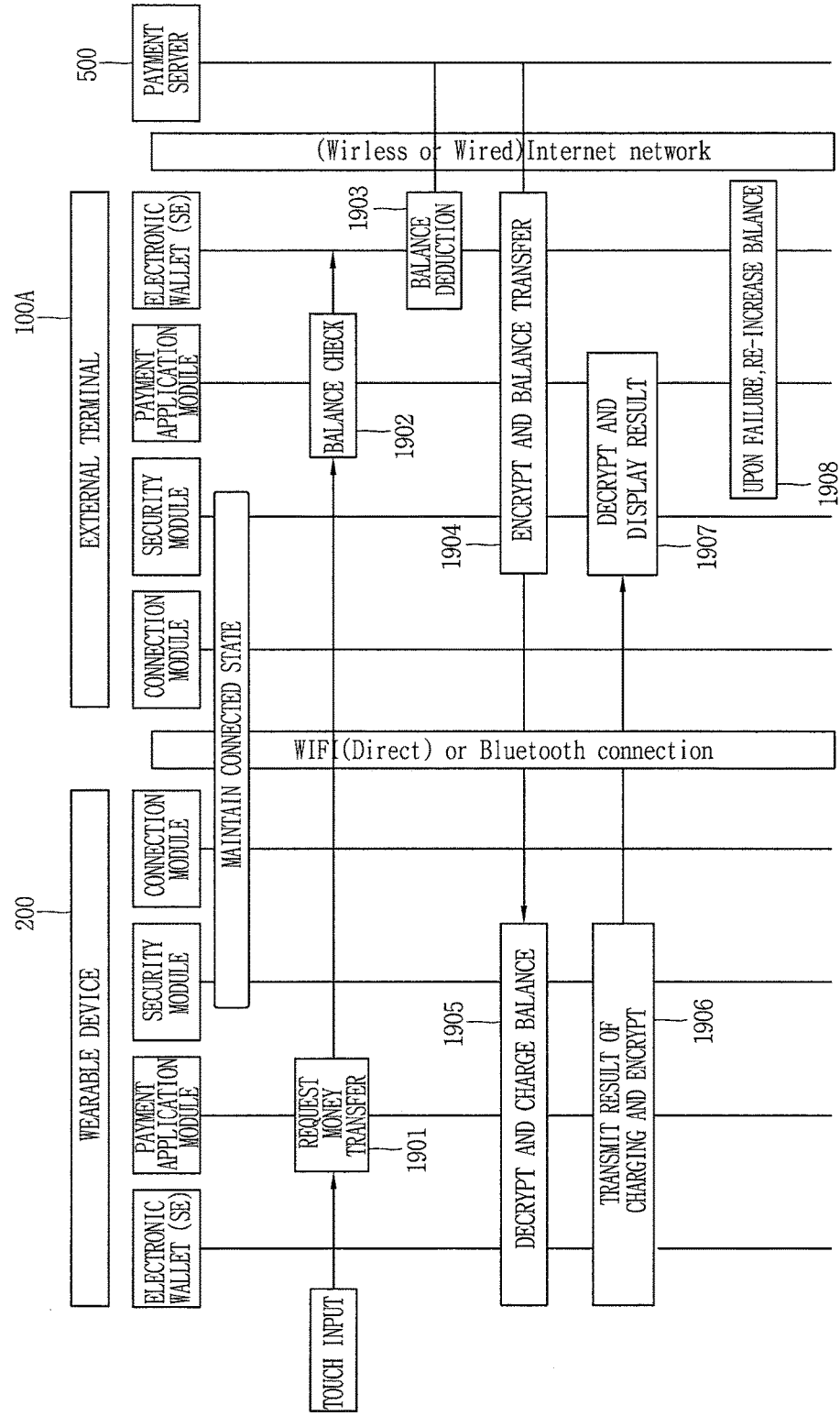
FIGS. 19 and 20 are concept views illustrating a method of transferring an amount of money charged over different communication networks between a linked second terminal and a wearable device according to an embodiment of the present invention.
Figure 20:
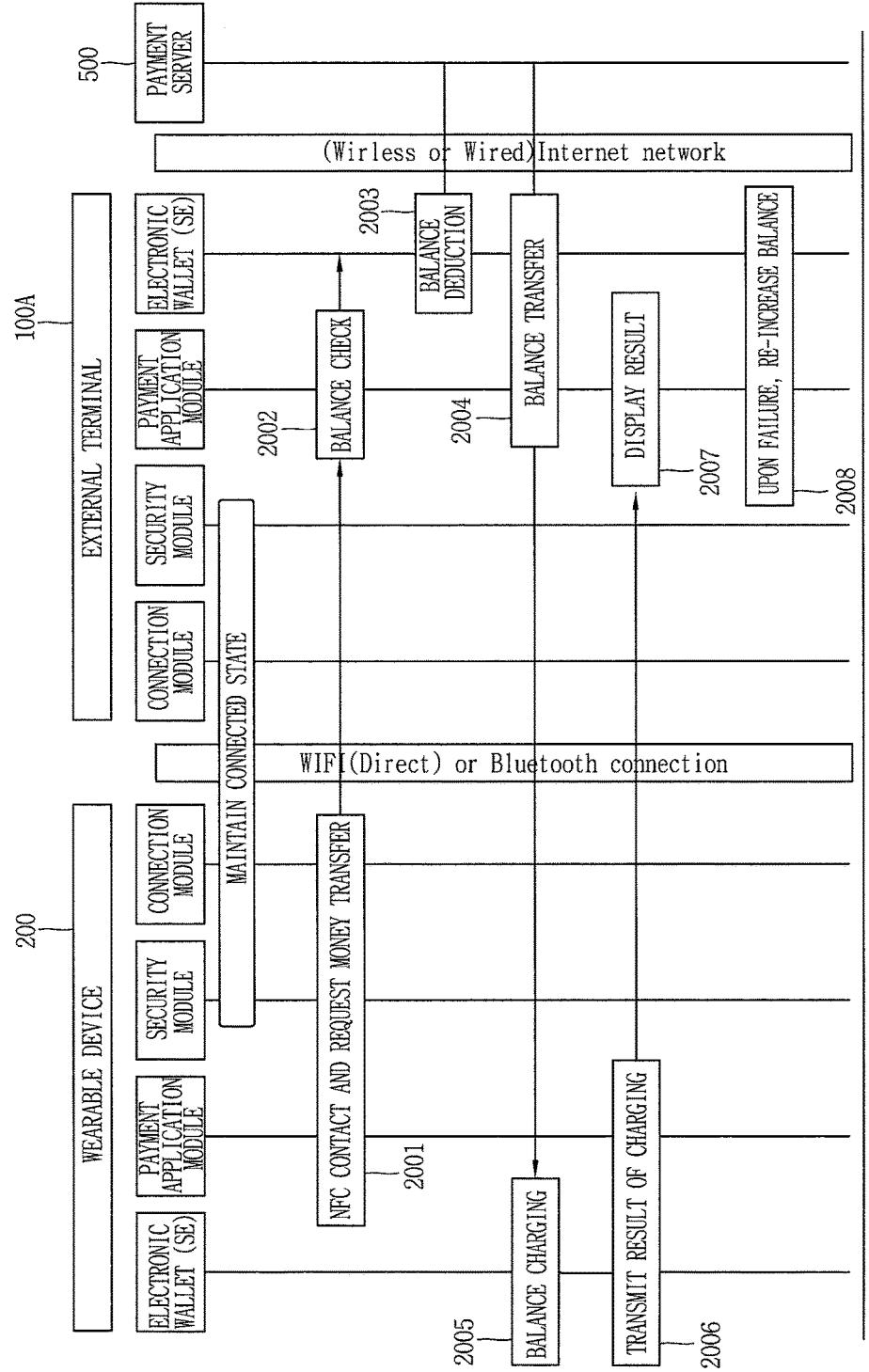

FIGS. 19 and 20 are concept views illustrating a method of transmitting a charged amount using different communication networks by a second terminal linked with a wearable device according to an embodiment of the present invention. FIG. 19 illustrates an embodiment in which an amount of money is transmitted using Wi-Fi or Bluetooth (BT) communication through the connection module (connection manager) 21 (FIG. 4) of the wearable device 200.

As shown in FIG. 19, when the wearable device 200 senses at least one of a preset gesture, a touch input, and a voice command corresponding to the above-described third input, a money transfer request event occurs (S1901). The money transfer request is sent to the connected second terminal 100A, and the payment application of the second terminal 100A checks the balance of the account of the electronic wallet equipped in the second terminal 100A (S1902). When a result of the checking shows there is an amount of money corresponding to the transfer request, the second terminal 100A deducts a corresponding amount from the electronic wallet (SE) account of the second terminal 100A in interworking with the payment server 500 (S1903).

Then, the second terminal 100A encrypts the deducted amount and sends it to the wearable device (S1904). The wearable device 200 decrypts the received information to charge the balance (S1905). The wearable device 200 encrypts a result of the charging and transmits it to the second terminal 100A. Then, the second terminal 100A outputs the received result of charging on the screen. At this time, when the wearable device 200 fails to charge, the balance of the electronic wallet (SE) account of the second terminal 100A is increased again (S1908).

As such, considering the probability of information leakage in Wi-Fi or Bluetooth (BT) communication, encryption and decryption are performed upon data communication between the wearable device 200 and the linked second terminal 100A, thus allowing for safe charging process.

In addition, FIG. 20 illustrates an embodiment in which an amount of money is transmitted through NFC communication using the NFC module 24 (FIG. 4) of the wearable device 200. Here, a money transfer request event occurs upon NFC contact (S2001). The process (S2002) of checking the balance of the account of the electronic wallet equipped in the second terminal 100A as per the money transfer request and the process (S2003) of deducting a corresponding amount of money from the electronic wallet (SE) account of the second terminal 100A in association with the payment server 500 are similar to those shown in FIG. 19.

Figure 21:
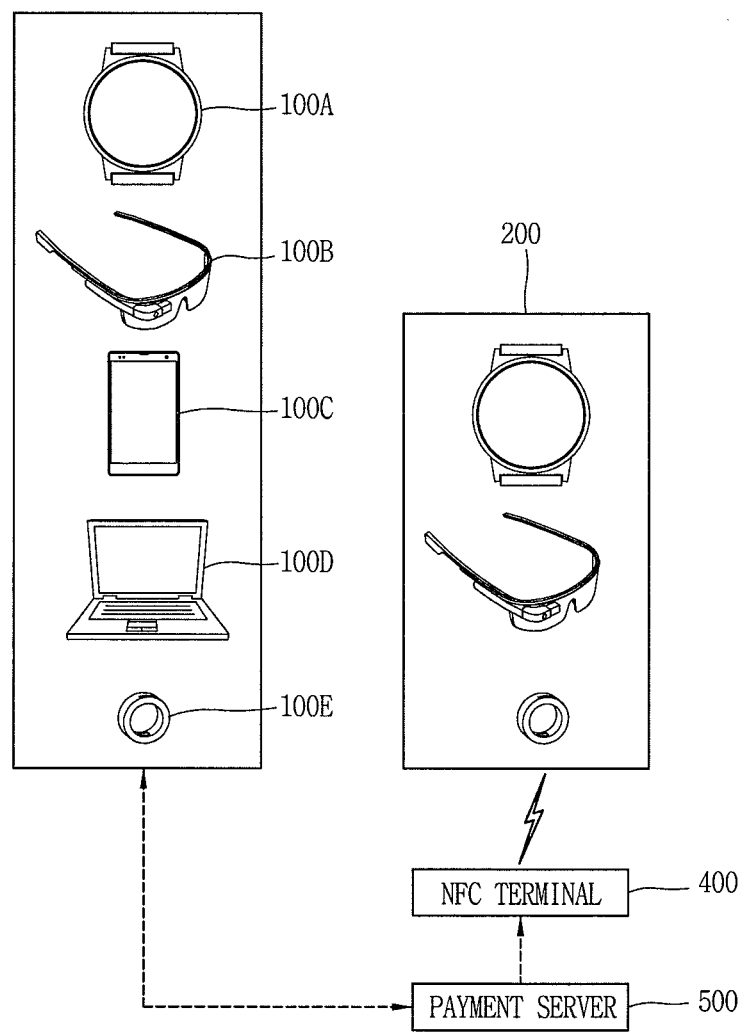
FIG. 21 is a view illustrating other example wearable devices that may perform an NFC payment function according to an embodiment of the present invention.

In this embodiment, however, data encryption and decryption are not conducted in the process (S2004) of transmitting the deducted amount from the second terminal 100A and the process (S2006) of charging the balance in the wearable device 200 and then transmitting a result of the charging thanks to a less chance of information leakage as compared with Wi-Fi or Bluetooth (BT) communication. Meanwhile, the balance charging using NFC contact is particularly useful in the case the amount to be charged is relatively small or the battery of the second terminal 100A is in low state. FIG. 21 illustrates other example wearable devices that can perform an NFC payment function according to an embodiment of the present invention.

As described above, according to an embodiment of the present invention, the amounts respectively charged to the plurality of devices may be collected to a desired device from a single wearable device, thereby able to make NFC payment. Accordingly, the user can efficiently make use of a small amount of money remaining in a plurality of electronic wallets.

Meanwhile, according to embodiments of the present invention, NFC payment may be performed with a plurality of second terminals (e.g., a watch-type terminal, a glasses-type terminal, a mobile terminal, a laptop computer, a ring-type terminal) 100A, 100B, 100C, 100D, and 100E linked with a plurality of other wearable devices (e.g., a watch-type terminal, a glasses-type terminal, a ring-type wearable device). In this instance, each device may equip an independent electronic wallet (SE) as described above, and the independent electronic wallet (SE) need not be mapped or registered with one account in performing the NFC payment function according to an embodiment of the present invention.

Further, the NFC payment function may be implemented by executing a particular application installed or downloaded to the wearable device 200, according to an embodiment of the present invention. Specifically, the NFC payment function application installed in the wearable device is driven. If the connection function corresponding to the above-described first input is executed on the driven application, a connection may be made to a second terminal equipping an electronic wallet (SE, Secure Element) through the server of the driven application. Then, if the information request function corresponding to the above-described second input is executed on the driven application, balance information of the balance corresponding to the electronic wallet (SE) may be received from the second terminal through the server of the driven application and may be output on the execution screen of the application. If the NFC (Near Field Communication) payment function is executed using the balance information output on the execution screen, a process result corresponding to the execution of the NFC payment function is displayed on the execution screen of the application.

As described above, the wearable device according to embodiments of the present invention may perform the NFC payment function using the amount charged to the linked second terminal even when the main body contains no information relating to the payment means. By such, the user can perform the NFC payment even without charging the amount per device. Further, the information relating to the payment method need not be retained in the wearable device, thus minimizing the risk of malicious information leakage that may occur when the device is lost. Further, the linkage with the second terminal and the activation of the NFC function for NFC payment may be easily done with an intuitive gesture or the user's preset gesture. Accordingly, the payment may be performed swiftly. Further, the payment may be made through a single wearable device with amounts of money respectively charged to a plurality of devices. Thus, small amounts of balance in the plurality of electronic wallets may be efficiently utilized.

According to the embodiment disclosed in the present invention, the method described above may be realized by being stored as processor-readable codes in a program-stored media. A ROM, a RAM, a CD-ROM, a magnetic tape, a floppy disk, an optical data storage device and the like are an example of the processor-readable media, and the processor-readable media may be realized in the form of a carrier wave (for example, a transmission over the Internet).

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A wearable device, comprising:
   a touchscreen;
   a wireless communication unit;
   a payment application module that runs in the background of the wearable device for linkage with an external terminal and connection to a payment server;
   a first electronic wallet (Secure Element, SE) module; and
   a controller configured to:
   in response to a first user gesture, perform linkage with an external terminal corresponding to the first user gesture among linkable external terminals, the external terminal including a second electronic wallet (SE) module to access an account of the second electronic wallet (SE) module of the external terminal, in response to a second user gesture while maintaining the linkage, receive information relating to the account of the second electronic wallet (SE) module from the external terminal, in response to receiving the information relating to the account of the second electronic wallet (SE) module, display first balance information of an account of the first electronic wallet (SE) module and second balance information of the account of the second electronic wallet (SE) module on the touchscreen, process NFC (Near Field Communication) payment mode in interoperation with the payment server using at least one account identified based on the first and second balance information displayed on the touchscreen, in response to a third user gesture, switch the NFC payment mode to a money transfer mode, in response to an execution of the money transfer mode, display an image object indicating a degree of charging of the first and second balance information on the touchscreen, and in response to a drag touch input applied to the image object, activate a fingerprint sensor of the wearable device on a region of the touchscreen which displays the image object and verify an identity of a user of the wearable device through the activated fingerprint sensor, and transfer a charged balance to one of the account of the first electronic wallet (SE) module and the account of the second electronic wallet (SE) module based on both a degree of dragging and a direction of the drag touch input applied to the image object.

2. The wearable device of claim 1, wherein the controller is configured to activate an NFC function for the NFC payment mode in response to the first user gesture and to output a feedback indicating that the NFC function is activated.

3. The wearable device of claim 1, further comprising:
a sensing unit configured to sense that the wearable device is rotated in different directions while the wearable device is placed on the user,
wherein the controller is further configured to:
execute a control operation corresponding to the first user gesture in response to the wearable device being rotated in a first direction, and
execute a control operation corresponding to the second user gesture in response to the wearable device being rotated in a second direction while the control operation corresponding to the first user gesture is in execution.

4. The wearable device of claim 1, wherein the controller is further configured to output a feedback corresponding to a response of the external terminal according to the linkage.

5. The wearable device of claim 4, wherein the feedback includes at least one or more of a vibration, a sound, and a screen change on the touchscreen, and
wherein when the linkage with the external terminal fails, the controller is further configured to output a feedback corresponding to the failure and to output information indicating a cause of the failure on the touchscreen.

6. The wearable device of claim 1, wherein the controller is further configured to output information indicating a result of processing the NFC payment mode on the touchscreen when the NFC payment mode is completed based on the first and second balance information displayed on the touchscreen.

7. The wearable device of claim 6, wherein the touchscreen includes a first region and a second region distinguished from the first region, and wherein the controller is further configured to, when the NFC payment mode is completed, display an NFC payment amount on the first region, update the first and second balance information of the first and second accounts of the first and second electronic wallet (SE) modules based on the NFC payment amount, and display the updated first and second balance information on the second region.

8. The wearable device of claim 7, wherein the controller is further configured to, when a level of the updated first and second balance information is not more than a reference level, output guide information to guide charging a balance corresponding to the first account of the first electronic wallet (SE) module on the touchscreen.

9. The wearable device of claim 1, wherein the controller is further configured to, when a predetermined time after the NFC payment mode is complete, switch the NFC function for the NFC payment mode to a deactivated state and release the linkage with the external terminal or change a communication network maintaining the linkage to another network.

10. The wearable device of claim 1, further comprising:
a power supply unit configured to supply operation power to the wearable device,
wherein the controller is further configured to, when a level of a battery included in the power supply unit is not more than a reference level, only display the first and second balance information of the first and second accounts of the first and second electronic wallet (SE) modules on a region of the touchscreen and switch another region of the touchscreen to a deactivated state.

11. The wearable device of claim 1, wherein the touchscreen includes a first region and a second region distinguished from the first region, and
wherein the controller is further configured to:
process the NFC payment using the first balance information, and
when the NFC payment mode is completed, display an NFC payment amount on the first region, update the first balance information based on the NFC payment amount, and display the updated information on the second region.

12. The wearable device of claim 11, wherein the controller is further configured to:
when an amount corresponding to the first balance information is insufficient to process the NFC payment mode, process the NFC payment mode using the first balance information and the second balance information, and
when the NFC payment mode is completed, display the NFC payment amount on the first region, update the first and second balance information based on the NFC payment amount, and display the updated information on the second region.

13. The wearable device of claim 1, wherein the controller is further configured to:
when another user gesture is input while the first and second balance information is displayed on the touchscreen, transmit at least a portion of a balance of a corresponding account from any one of an account of the first electronic wallet (SE) module and an account of the second electronic wallet (SE) module to the other account.

14. The wearable device of claim 13, wherein the other user gesture is a preset user gesture, wherein the wearable device further comprises a sensing unit configured to sense an inclination corresponding to the other user gesture, and wherein the controller is further configured to determine an account to which at least the portion of the balance is transmitted and a degree of the balance based on at least one of a direction and degree of the inclination corresponding to the third user gesture.

15. A method of controlling a wearable device, the method comprising:

running a payment application module in the background of the wearable device for linkage with an external terminal and connection to a payment server;

in response to a first user gesture, performing, via a controller of the wearable device, linkage with the external terminal corresponding to the first user gesture among linkable external terminals, the external terminal including a second electronic wallet (Secure Element) module to access to an account of the second electronic wallet (SE) module of the external terminal;

in response to a second user gesture while maintaining the linkage, receiving information relating to the account of the second electronic wallet (SE) module from the external terminal;

in response to receiving the information relating to the account of the second electronic wallet (SE) module, displaying first balance information of the account of a first electronic wallet (SE) module in the wearable device and second balance information of the account of the second electronic wallet (SE) module on a touchscreen of the wearable device;

processing, via the controller, NFC (Near Field Communication) payment mode in interoperation with the payment server using at least one account identified based on the first and second balance information displayed on the touchscreen;

in response to a third user gesture, switching, via the controller, the payment mode to a money transfer mode;

in response to an execution of the money transfer mode, displaying an image object indicating a degree of charging of the first and second balance information on the touchscreen; and in response to a drag touch input applied to the image object, activating, via the controller, a fingerprint sensor of the wearable device on a region of the touchscreen which displays the image object and verifying, via the controller, an identity of a user of the wearable device through the activated fingerprint sensor, and transferring, via the controller, a charged balance to one of the account of the first electronic wallet (SE) module and the account of the second electronic wallet (SE) module based on both a degree of dragging and a direction of the drag touch input applied to the image object.

* * * * *